United States Patent [19]

Carlo et al.

[11] Patent Number: 5,412,963
[45] Date of Patent: May 9, 1995

[54] REMOTE CONTROL ANTI-THEFT DEVICE

[75] Inventors: Louis D. Carlo, Litchfield; Larry A. Wise, Atwater; Danut Voiculescu, Cleveland; John Rutkoski, Cuyahoga Falls, all of Ohio

[73] Assignee: Winner International Royalty Corporation, Sharon, Pa.

[21] Appl. No.: 78,831

[22] Filed: Jun. 21, 1993

[51] Int. Cl.⁶ .............................................. B60R 25/10
[52] U.S. Cl. ........................................ 70/209; 70/279; 70/237; 70/257; 340/825.69; 340/825.5; 340/426; 180/287
[58] Field of Search ................ 70/238, 279, 278, 280, 70/281, 277, 209, 211, 212, 225, 226, 237, 238, 256, 257, 271, 274; 180/287; 340/825.69, 825.72, 425.5, 426

[56] References Cited

U.S. PATENT DOCUMENTS

| | | | |
|---|---|---|---|
| 289,491 | 4/1887 | Johnson | D8/330 |
| 306,252 | 2/1890 | Johnson | D8/331 |
| 1,395,970 | 12/1921 | Nidermaier | 70/226 |
| 3,795,896 | 3/1974 | Isaacs | 340/171 R |
| 4,083,424 | 4/1978 | von den Stemmen et al. | 70/278 |
| 4,162,486 | 7/1979 | Wyler | 340/825.69 |
| 4,733,215 | 3/1988 | Memmola | 340/426 |
| 4,738,127 | 4/1988 | Johnson | 70/209 |
| 4,747,280 | 3/1988 | Shaw | 70/279 |
| 4,835,531 | 5/1989 | Sato | 340/825.69 |
| 4,856,308 | 8/1989 | Johnson | 70/209 |
| 4,926,160 | 5/1990 | Hwang | 340/426 |
| 4,935,047 | 6/1990 | Wu | 70/209 |
| 4,942,393 | 7/1990 | Waraksa et al. | 340/825.72 |
| 4,958,084 | 9/1990 | Carlo et al. | 340/426 |
| 4,961,331 | 10/1990 | Winner | 70/209 |
| 5,128,649 | 7/1992 | Elmer | 70/237 |
| 5,181,403 | 1/1993 | Lii | 70/238 |
| 5,197,309 | 3/1993 | Del Rosario | 70/279 |
| 5,252,966 | 10/1993 | Lambropoulos et al. | 340/825.69 |
| 5,277,042 | 1/1994 | Tobias | 70/226 |
| 5,291,761 | 3/1994 | Lii | 70/226 |

FOREIGN PATENT DOCUMENTS

| | | | |
|---|---|---|---|
| 0478453 | 4/1992 | European Pat. Off. | 70/238 |
| 2223261 | 4/1990 | United Kingdom | 70/237 |
| 2246105 | 1/1992 | United Kingdom | 70/238 |

Primary Examiner—Peter M. Cuomo
Assistant Examiner—Darnell M. Boucher
Attorney, Agent, or Firm—Vickers, Daniels & Young

[57] ABSTRACT

A vehicle anti-theft device in the form of a vehicle steering wheel lock comprising extendable and retractable members having hooks that are on for engaging diametrically opposed portions of a steering wheel to mount the anti-theft device on the steering wheel. It is provided with a motor operated lock mechinism remotely controlled by a personal identification encoder. The lock mechinism also includes a key operated portion, and the lock mechinism is operable either through the use of a key or through the use of the remotely controlled encoder.

62 Claims, 14 Drawing Sheets

REMOTE CONTROL ANTI-THEFT DEVICE

The present invention relates to the art of anti-theft devices and, more particularly, to improved vehicle anti-theft devices for attachment to a steering wheel of a vehicle to prevent unauthorized operation of the vehicle by limiting rotation of the steering wheel within the vehicle.

INCORPORATION BY REFERENCE

U.S. Pat. Des. No. 289,491 dated Apr. 28, 1987; U.S. Pat. Des. No. 306,252 dated Feb. 27, 1990; U.S. Pat. No. 4,738,127 dated Apr. 19, 1988; U.S. Pat. No. 4,856,308 dated Aug. 15, 1989; U.S. Pat. No. 4,935,047 dated Jun. 19, 1990; and, U.S. Pat. No. 4,961,331 dated Oct. 9, 1990 are incorporated by reference herein and illustrate types of mechanical security devices which are a part of or can be used in conjunction with the present invention.

BACKGROUND OF THE INVENTION

The invention has particular application to preventing the increasing incidences of theft of vehicles by facilitating the ease of use and thus promoting the use of anti-theft devices attachable to a vehicle steering wheel to limit rotation thereof, and the invention will be described with particular reference thereto; however, the invention has broader applications which will become apparent upon the reading of the specification.

Over the last several years, there has been a growing demand by vehicle owners to better secure their vehicles against theft when the vehicle is left unattended. Due to the increased crime rate, vehicle insurance premiums have increased with respect to vehicles not protected by an anti-theft device. In an effort to address these security problems, various industries have developed which manufacture and promote various mechanisms to deter the theft of a vehicle. Presently, there are a large number of anti-theft devices for motor vehicles on the market. In addition, many motor vehicles are provided from the factory with integrated security or theft prevention systems. Common vehicle security mechanisms include electronic devices such as alarms or so called "killer" switches which disable the engine and/or ignition of the vehicle unless bypassed by the authorized operator. Most of these security mechanisms which incorporate the use of alarms or "killer" switches employ complicated and sophisticated circuitry which requires professional installation and/or maintenance. In addition to the high cost of installing and maintaining these types of electronic security devices, the complexity of these systems prevents a typical motorist from deactivating the system in case of a malfunction of the security device.

Mechanical security devices have also been developed such as steering wheel locks, which inhibit unauthorized operation of the vehicle by constraining the relative movement of various components within the vehicle such as a steering wheel, gas pedal, clutch or brake. Many of these devices include extendable and retractable hooks adapted to engage the steering wheel rim or the steering wheel rim and another component within the vehicle. When mounted, the hooks are locked against relative displacement and must be unlocked in order to remove the device from the steering wheel. These mechanical steering wheel locks are extremely effective when used but, often, are not used by a vehicle owner because of the inconvenience of locking and/or unlocking the devices in connection with attaching and/or removing the device from the steering wheel. In this respect, these mechanical locks require the use of a key to unlock the device for removal, and many require use of the key to achieve attachment of the device to the steering wheel. In either event, the vehicle owner, upon re-entering the vehicle, must insert a key into the mechanical lock and deactivate the lock before he can remove the device from the steering wheel. Insertion of the key into the lock is at the very least inconvenient especially if the vehicle owner is in a hurry, and such inconvenience often overrides the owner's concern for the security of the vehicle and, consequently, the device is not used. Thus, there is a substantial need for providing devices of the foregoing character with an operating capability which promotes the use thereof by rendering the device more convenient for the vehicle operator to attach and remove from the vehicle steering wheel.

SUMMARY OF THE INVENTION

The present invention overcomes the above-described disadvantages and others and provides a vehicle security device which is inexpensive, convenient to use and effective in protecting against theft of a motor vehicle. In accordance with the present invention, a lockable and unlockable anti-theft device is provided which is more easily and conveniently attached to and removed from a motor vehicle than devices heretofore available. More particularly in this respect, the anti-theft device can be locked and/or unlocked from a position remote from the vehicle in which the anti-theft device is located. The locking and/or unlocking of the anti-theft device may be by an active and/or passive control system. An active system requires the authorized vehicle owner to manually activate a remote controller to lock and/or unlock the anti-theft device. A passive system locks and/or unlocks the anti-theft device based on the distance between the controller and vehicle and without physical intervention by the vehicle owner. The anti-theft device and controller can be designed to incorporate both an active and passive system. Preferably, the anti-theft device is a passive system which minimizes the effort of the vehicle owner in securing and unsecuring the anti-theft device.

In a preferred embodiment, the anti-theft device is a steering wheel lock which comprises relatively displaceable hooks for attaching the anti-theft device to the steering wheel of a vehicle. As is well known, such an anti-theft device includes a member which extends radially outwardly of the steering wheel to restrict and prevent the complete rotation of the steering wheel. A locking system is provided on the anti-theft device which is controllable from a location remote from the device for locking and unlocking the device upon leaving and returning to the vehicle, respectively.

More particularly in this respect, the steering wheel lock includes a body portion supporting one of the hooks and telescopically receiving a rod member which carries the other hook. The rod member is provided with annular grooves therealong and the body portion includes a lock housing in which a latch member is supported for displacement between latched and unlatched positions relative to the rod grooves. In the latched position, the rod is extendable relative to the body portion but is not retractable relative thereto, and in the unlatched position the rod is freely extendable and retractable relative to the body portion. In accordance with one aspect of the present invention, a motor-driven latch actuating mechanism is provided in the lock housing and is operable to displace the latch member between the latched and unlatched positions thereof. The lock housing is also provided with a control circuit and power supply by which the motor is activated to achieve the latch member displacements. Preferably, as mentioned above, such activation is controlled by a remote encoder, and the control circuit includes a receiver responsive to an appropriate coded signal from the remote encoder to activate or deactivate the motor. In a preferred embodiment, the latch member is spring biased to the latched position thereof, and the lock housing further supports a rotatable key-operated tumbler by which the latch member is displaceable from the latched to the unlatched position when the motor-operated latch actuating mechanism is positioned for the latch member to be in the latched position thereof. When the latter mechanism is operated to displace the latch member to its unlatched position, the tumbler is inoperative to displace the latch to its latched position. Accordingly, provision is made for manually displacing the motor-operated latch actuating mechanism to the position in which the latch member is in its latched position, whereby the device can be locked in the event that the motor becomes inoperable by, for example, loss of battery power. When the motor-operated latch actuating mechanism is in a position corresponding to the latched position of the latch member, the key-operated tumbler is operable to displace the latch member between the latched and unlatched positions thereof. This advantageously provides for the anti-theft device to be operable independent of the motor-driven latch actuating mechanism.

In accordance with another aspect of the invention, and for the foregoing purpose, the motor-driven latch actuating mechanism is adapted to be selectively disabled with respect to displacing the latch member, regardless of whether or not the motor is operable. In a preferred embodiment, a component part of the latch actuating mechanism which operatively engages the latch member to displace the latter to the unlatched position thereof is manually displaceable to disengage the latch member, whereby the latter is operable between its latched and unlatched positions by the lock tumbler. Thus, the latch is displaceable between its latched and unlatched positions independent of the motor-operated latch actuating mechanism, even if the motor is activated to operate the mechanism. Both arrangements advantageously provide for the locking mechanism to have two modes of operation, one by the motor-operated latch actuating mechanism and the other by key operation of the tumbler. Furthermore, both arrangements advantageously provide for overriding the motor-operated latch actuating mechanism when the position of the latter provides for the latch member to be held in its unlatched position, whereby the device is lockable in the event that the motor is inoperable for any reason.

In accordance with another aspect of the invention, the remote controller is a personal identification unit (PID) carried by an authorized operator of the motor vehicle and operable to actuate the locking mechanism in the anti-theft device without having to manually use a key as required with prior devices. Preferably, the PID and the control circuit in the device provide for passive actuation of the locking mechanism without physical intervention by the owner. In this respect, the PID is capable of identifying its location in the vicinity of the anti-theft device and, when an authorized operator is in the vicinity of the anti-theft device, the PID operates to activate the control circuit in the device, thus to actuate the locking mechanism. Further in this respect, the control circuit is shifted between a first and second condition depending on the location of the PID relative to the anti-theft device. The first condition unlocks the locking mechanism and allows the operator to freely attach or detach the anti-theft device relative to the steering wheel. The second condition actuates the locking mechanism to lock the anti-theft device in position on the steering wheel. The control circuit automatically shifts into the second, or locking, mode of operation when the PID is moved beyond a predetermined distance from the vehicle and, when the PID is moved back within the predetermined distance, the control circuit automatically shifts back to the first condition. This passive locking system significantly enhances the convenience of locking and unlocking the anti-theft device and ensures that the device is in a locked condition when the vehicle owner is away from the car.

In accordance with another aspect of the present invention, the PID is operable in an active mode which requires that the vehicle owner physically actuate the PID to both activate and deactivate the control circuit and thus the locking mechanism. For this purpose, the PID includes a pushbutton or the like which is depressed by the vehicle owner to activate the control circuit. Successive depressions of the pushbutton, when the vehicle owner is within a predetermined distance from the vehicle, shifts the control circuit alternately between the first and second modes and, accordingly, alternately unlocks and locks the anti-theft device. The PID can include a mode switch for selectively changing the PID from active to passive operation.

It is accordingly an outstanding object of the present invention to provide an improved locking arrangement between relatively displaceable component parts of a vehicle anti-theft device attachable to a vehicle's steering wheel or to the steering wheel and another component part of the vehicle to limit rotation of the steering wheel.

Another object is the provision of a vehicle anti-theft device of the foregoing character with a locking arrangement between the component parts thereof which is adapted to be actuated between locked and unlocked conditions from a location remote from the vehicle.

A further object is the provision of a lockable vehicle anti-theft device of the foregoing character with a motor-driven locking mechanism including a latch member adapted to be displaced between latched and unlatched positions relative to the component parts of the device in response to operation of the motor.

Yet another object is the provision of a lockable anti-theft device of the foregoing character which includes a control circuit and power supply for operating the motor and wherein the control circuit is operable to actuate the motor in response to a control signal issued from a location remote from the vehicle.

Still a further object is the provision of a lockable anti-theft device of the foregoing character, wherein the locking mechanism includes a key-operated lock tumbler, and the device is adapted to be locked and unlocked selectively by use of a key or by the motor-operated latch actuating mechanism.

Still another object is the provision of a lockable anti-theft device of the foregoing character, wherein the motor-operated latch actuating mechanism can be manually manipulated from the unlocked to the locked mode thereof.

Another object is the provision of a lockable antitheft device of the foregoing character, wherein the motor-operated latch actuating mechanism can be manually rendered inoperable for locking and unlocking the device.

A further object is the provision of a remotely operable personal identification unit for controlling actuation of a motor-driven latch actuating mechanism in a vehicle anti-theft device selectively in an active or passive mode with respect to such control.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which.

DESCRIPTION OF PREFERRED EMBODIMENTS

Figure 1:
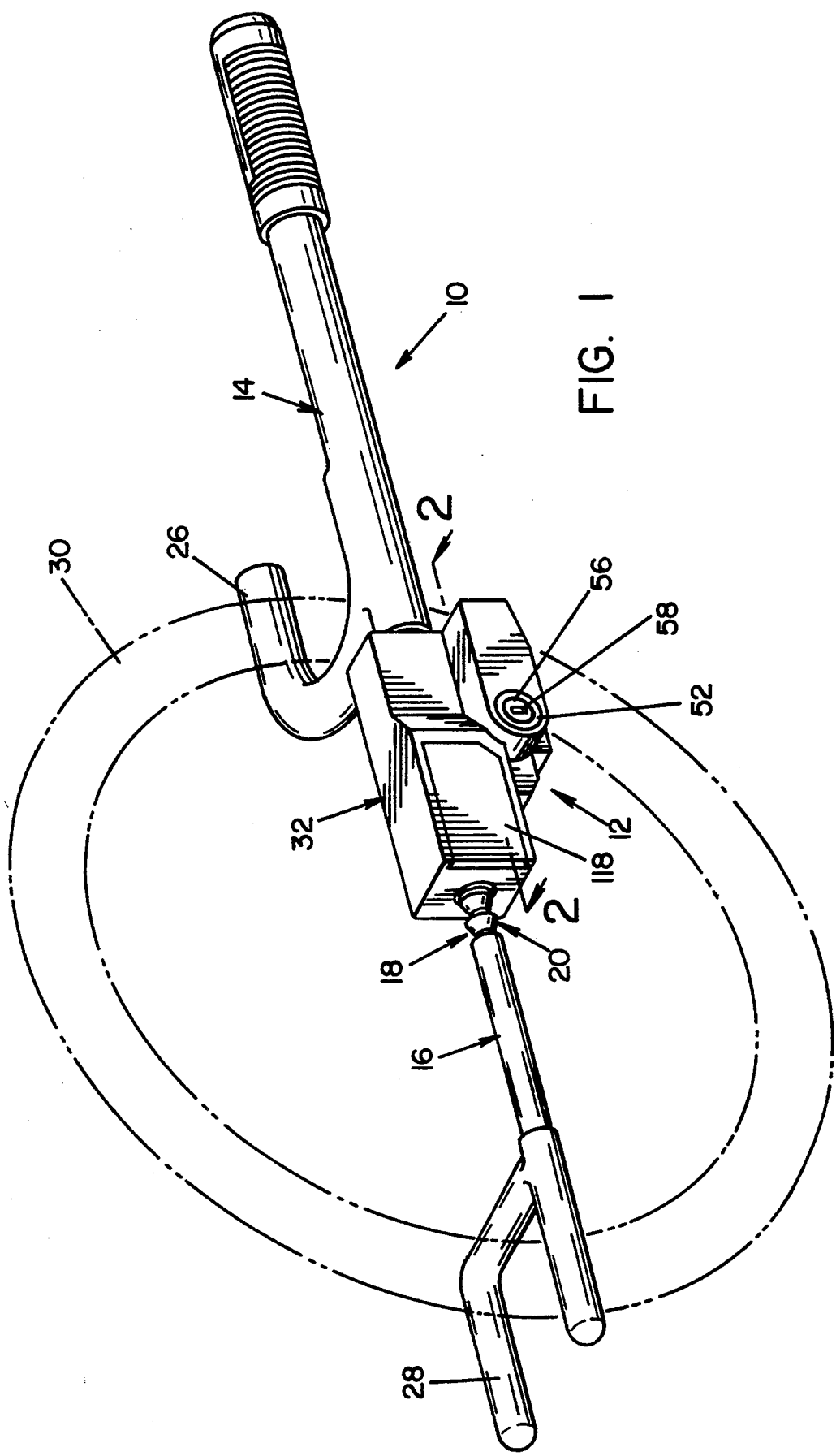
FIG. 1 is a perspective view of a steering wheel lock bar incorporating a remotely-controlled locking mechanism in accordance with the present invention.

Referring now in greater detail to the drawings wherein the showings are for the purpose of illustrating preferred embodiments of the invention only, and not for the purpose of limiting the invention, a vehicle steering wheel lock bar 10 having a remotely controllable lock mechanism 12 in accordance with the present invention is illustrated in FIGS. 1–8 of the drawings. Lock bar 10 includes a tubular body portion 14 telescopically receiving an elongated rod member 16 having a plurality of annular grooves 18 along the length thereof and which provide annular ratchet teeth 20 each defined by a conical surface 22 and a radial surface 24. Rod member 16 is adapted to be displaced between extended and retracted positions relative to body member 14 and, as set forth more fully hereinafter, the conical and radial surfaces of teeth 20 are cooperable with a latch member in the locking mechanism to permit displacement of rod 16 relative to body portion 14 in the direction of extension while precluding such relative displacement in the direction of retraction. Lock bar 10 includes a hook 26 on body portion 14 and a hook 28 on rod member 16, which hooks are opened in axially opposite directions relative to body portion 14 and rod member 16. Hooks 26 and 28 provide attachment components for releasably securing lock bar 10 on a vehicle steering wheel 30 and, as is well known in conjunction with such steering wheel lock bars, rod member 16 is adapted to be retracted relative to body portion 14 sufficiently to provide for hooks 26 and 28 to be diametrically aligned with steering wheel 30, whereupon rod member 16 is extended relative to body portion 14 for the hooks to be positioned relative to the steering wheel as shown in FIG. 1. As is further well known, body portion 14 extends radially outwardly from steering wheel 30 and has a length in this direction sufficient to cause the body portion to engage a surface within the vehicle and/or a person sitting in the driver's seat so as to preclude rotation of the steering wheel.

Lock mechanism 12 is enclosed in a lock housing 32 fixedly secured to body portion 14 of steering wheel lock bar 10 and includes a latch member 34 slidably supported in a bore 36 in housing 32 extending radially with respect to rod member 16. Latch member 34 has a nose at the end thereof adjacent to rod member 16 and which is defined by an inclined surface 38 facing conical surfaces 22 of teeth 20 and a radial surface 40 facing radial surfaces 24 of teeth 20. A spring 42 is interposed between the opposite end of latch member 34 and bore 36 and biases latch member 34 radially inwardly relative to rod member 16. Latch member 34 is provided with an elongated slot intermediate its opposite ends and which, with respect to the latch member axis, has an axially extending flat bottom surface 44 and axially spaced apart radially extending end surfaces 46 and 48. Further, for the purpose set forth hereinafter, latch member 34 has a pin 50 extending radially outwardly from the side thereof opposite surface 44 of the slot and at the end thereof adjacent surface 48. Pin 50 extends through a guide slot 51 in housing 32 which precludes rotation of latch member 34 about its axis.

Lock mechanism 12 further includes a lock cylinder 52 suitably secured in a bore 54 provided therefor in housing 32. Lock cylinder 52 supports a rotatable key operable tumbler 56 having a key slot 58 therein. As will be understood, tumbler 56 is rotatable relative to cylinder 52 when an appropriate key is introduced into slot 58 and turned about the lock cylinder axis. The inner end of tumbler 56 is provided with a cam 60 rotatable therewith and which, with respect to the lock cylinder axis, has an axially extending flat cam face 62 and an axially extending circular cam surface 64 between the diametrically opposite ends of surface 62. When the component parts are in the assembled positions thereof, cam 60 is received in the slot in latch member 34 with cam surfaces 62 and 64 being interposed between end surfaces 46 and 48 of the slot.

Lock mechanism 12 further includes a motor-driven latch actuating mechanism including an electric servomotor 66, the control of which is described in greater hereinafter, and a latch actuating lever 68 which is driven by motor 66 and which, as will become apparent hereinafter, is cooperable with spring 42 to achieve displacement of latch member 34 between the latched and unlatched positions thereof relative to teeth 20 of rod member 16. Lever 68 is adapted to be driven by motor 66 through a crank defined by a disc 70 attached to drive shaft 72 of motor 66 and a pin 74 attached to the disc. Pin 74 extends through an opening 73 therefor in leg 75 of lever 68 and into a threaded opening in disc 70, not designated numerically, radially spaced from drive shaft 72. For the purpose set forth hereinafter, disc 70 is provided with radially outwardly extending noses 76 on diametrically opposite sides thereof, and the housing of motor 66 supports a spring arm 78 having a nose 80 positioned to engage noses 76 of disc 70 when the latter is rotated by the motor. Lever 68 includes a leg 82 at the end thereof opposite leg 75, and leg 82 includes an elongated slot 84. The motor-driven portion of lock mechanism 12 is disposed in a compartment in housing 32 closed by a cover 86, and a stepped pin 88 is mounted on cover 86 and has a small diameter pin portion 90 disposed in lever slot 84. Thus, it will be appreciated that rotation of disc 70 oscillates lever 68 relative to pin 90. As will be further appreciated from FIGS. 2 and 3 of the drawings, leg 82 of lever 68 extends across latch pin 50 between the latter and the nose of latch member 34, whereby displacement of lever 68 from the position shown in FIG. 2 to the position shown in FIG. 5 displaces latch member 34 from the latched to the unlatched position thereof and that displacement of the lever from the position shown in FIG. 5 back to the position shown in FIG. 2 releases latch member 34 for displacement back to the latched position under the bias of spring 42. As explained more fully hereinafter, motor 66 is operable to displace lever 68 in the foregoing manner.

Figure 2:
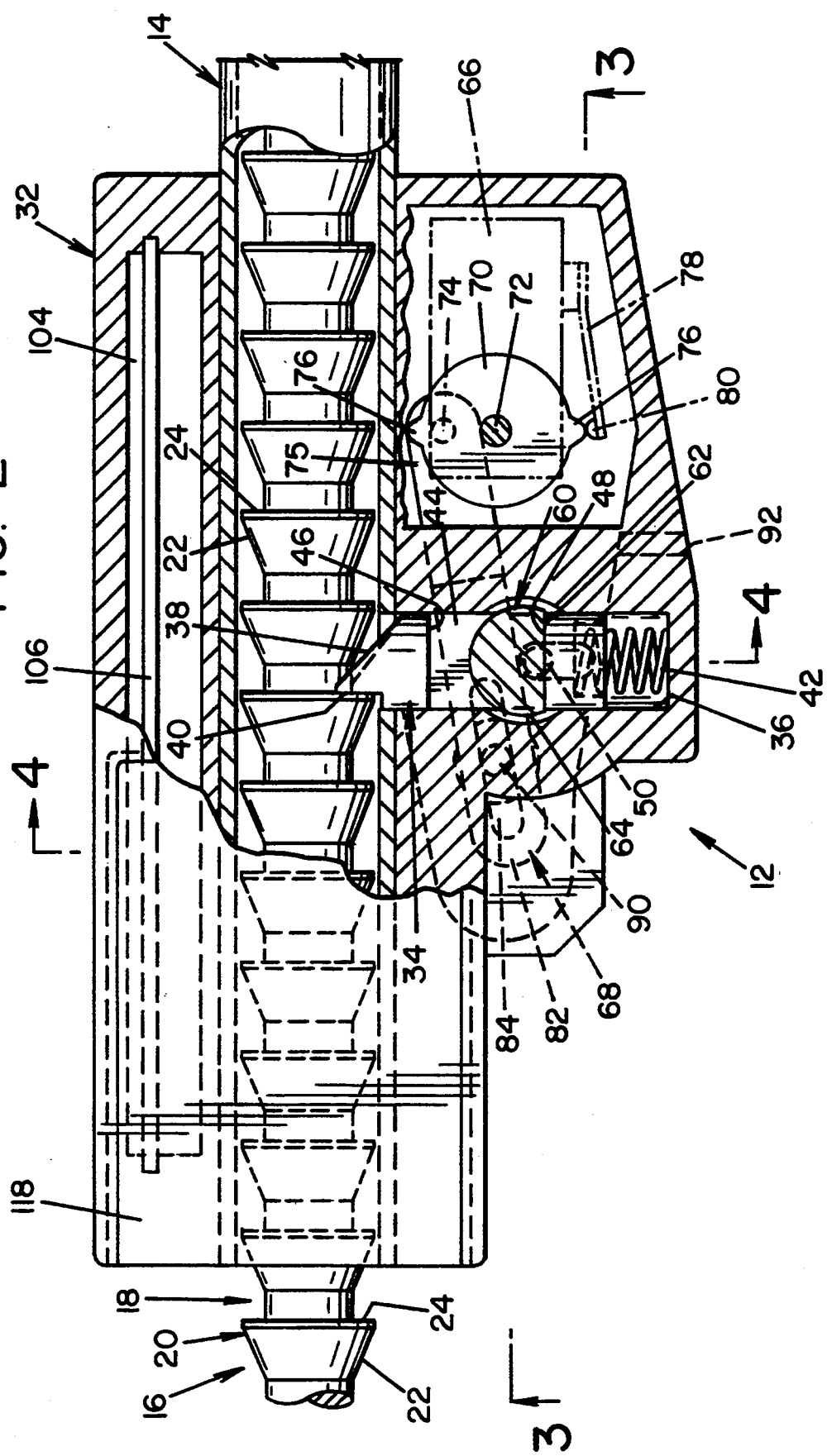
FIG. 2 is a front elevation view, partially in section, of the lock housing of the lock bar taken along line 2—2 in FIG. 1 and showing the component parts of the lock mechanism in the locked positions.
Figure 3:
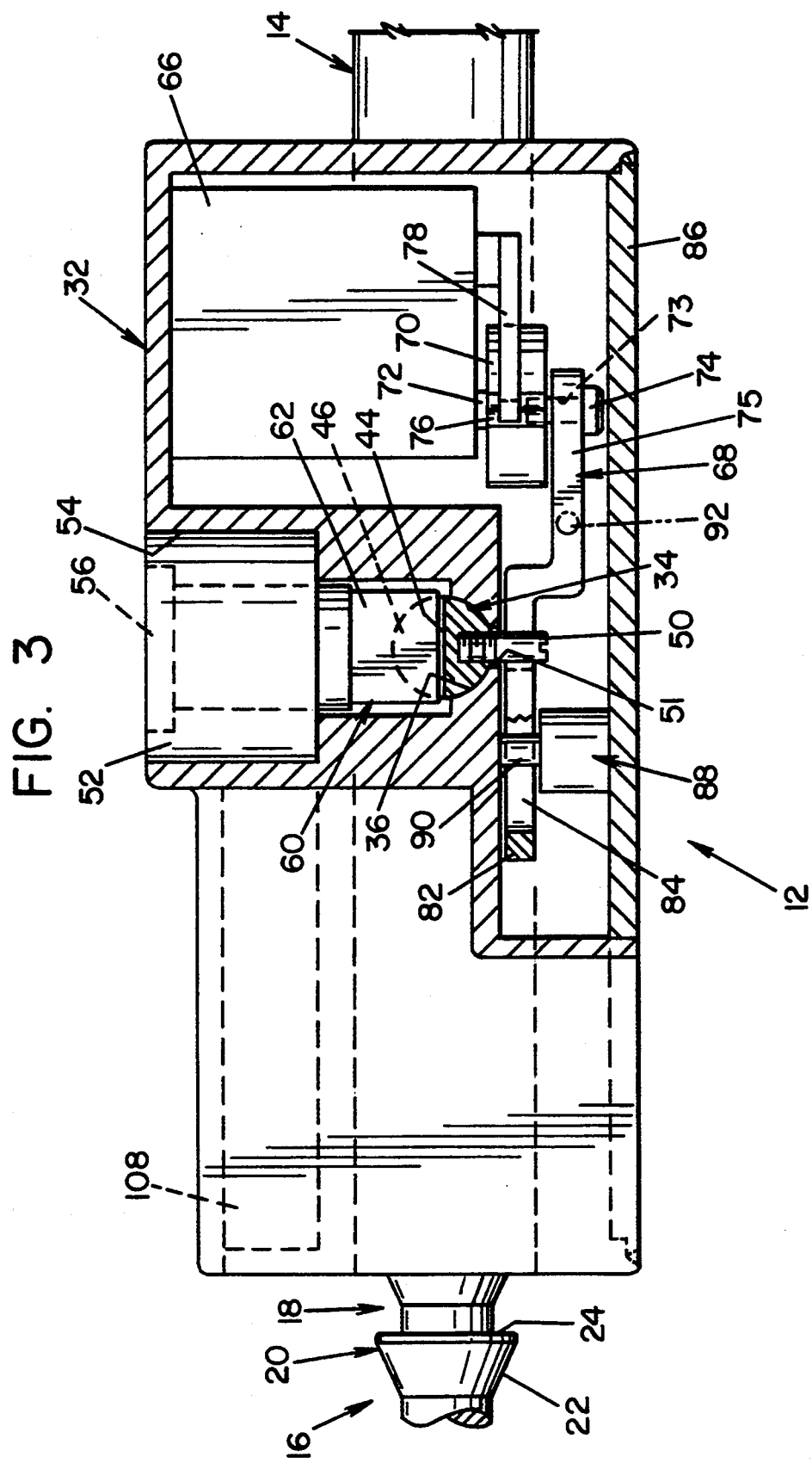
FIG. 3 is a sectional elevation view of the lock housing taken along line 3—3 in FIG. 2.

From the description thus far, it will be appreciated that the component parts of the lock mechanism are in the positions thereof shown in FIG. 2 when the lock mechanism is in the locked mode. More particularly in this respect, latch member 34 is in its latched position under the bias of spring 42, flat tumbler cam face 62 facially engages end surface 48 of the slot in the latch member, and lever 68 is positioned relative to latch pin 50 such that the latch member is free to move to the latched position under the bias of spring 42. When the lock mechanism is in the locked mode, surface 40 of the nose of latch member 34 engages against the radial latch keeper surface 24 of one of the teeth 20 of rod member 16 to preclude displacement of the rod member to the right in FIGS. 1 and 2, thus locking the steering wheel lock bar against removal from steering wheel 30. At the same time, the distance between end surfaces 46 and 48 of the slot in latch member 34 is sufficient to enable latch member 34 to be displace downwardly in FIG. 2 relative to tumbler cam 60 and against the bias of spring 42, whereby rod member 16 can be displaced to the left in FIG. 2 relative to body portion 14 in that conical surfaces 22 of teeth 20 will engage inclined latch surface 38 to cam the latch member downwardly in response to such displacement of the rod member. Furthermore, as will be appreciated from FIG. 6 of the drawings, when the lock mechanism is in the locked mode shown in FIG. 2, rotation of tumbler cam 60 about its axis relative to latch member 34 displaces the latter to the unlatched position against the bias of spring 42. Thus, when the steering wheel lock bar is in the mounted position on steering wheel 30 and the lock mechanism including the motor-driven lever portion thereof is in the locked mode, the vehicle owner can unlock the device manually through the key-operated lock portion to release lock member 16 for displacement to the right in FIGS. 1 and 2 relative to body portion 14 as is necessary to remove the steering wheel lock bar from the steering wheel. Accordingly, it will be appreciated that when the lock mechanism is in the locked mode as shown in FIG. 2, the steering wheel lock bar is adapted to be manually locked and unlocked through the use of the key-operated portion of the lock mechanism.

Figure 5:
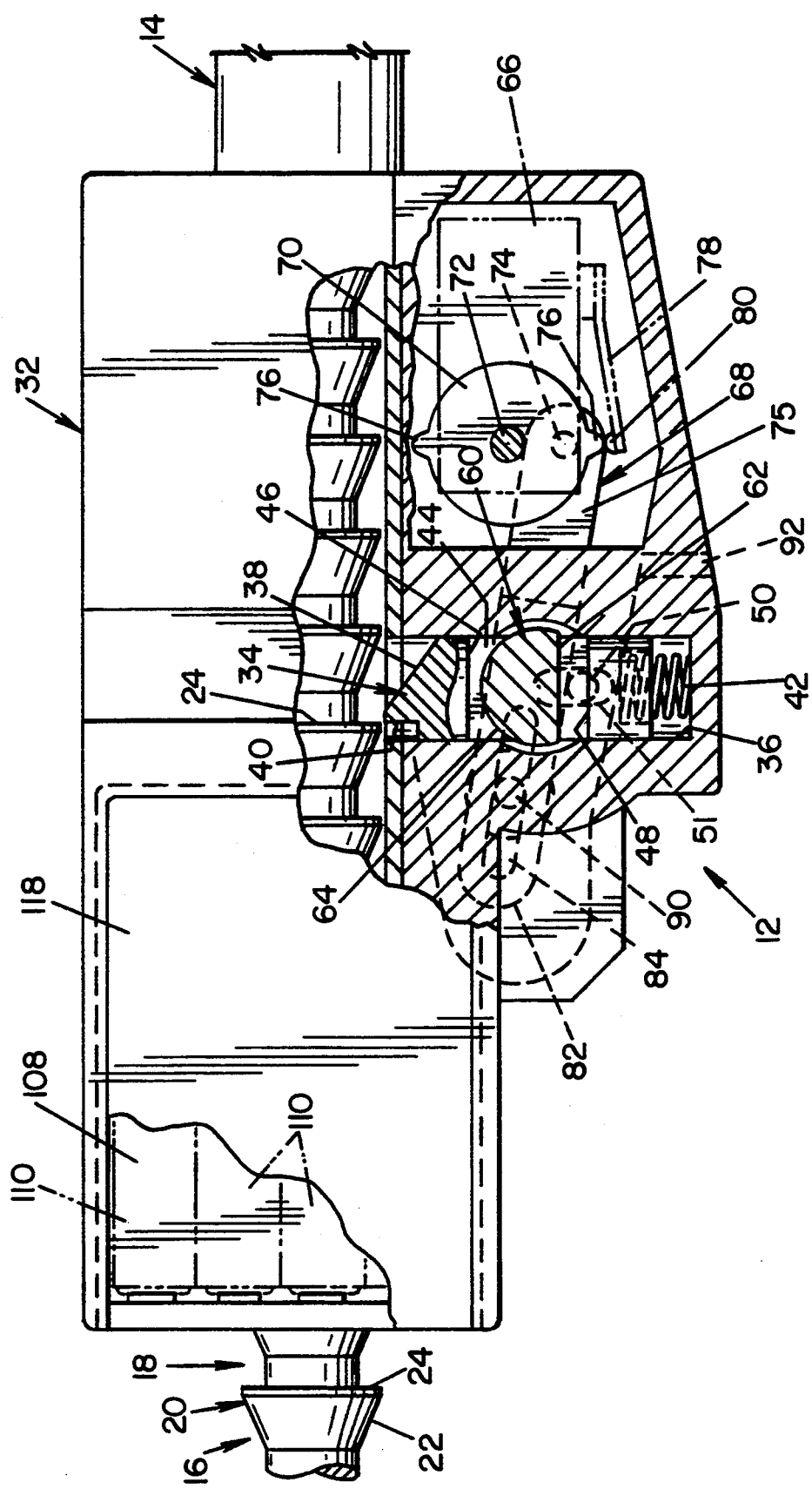
FIG. 5 is an elevation view, partially in section, similar to FIG. 2 and showing the component parts of the locking mechanism in the unlocked positions.
Figure 6:
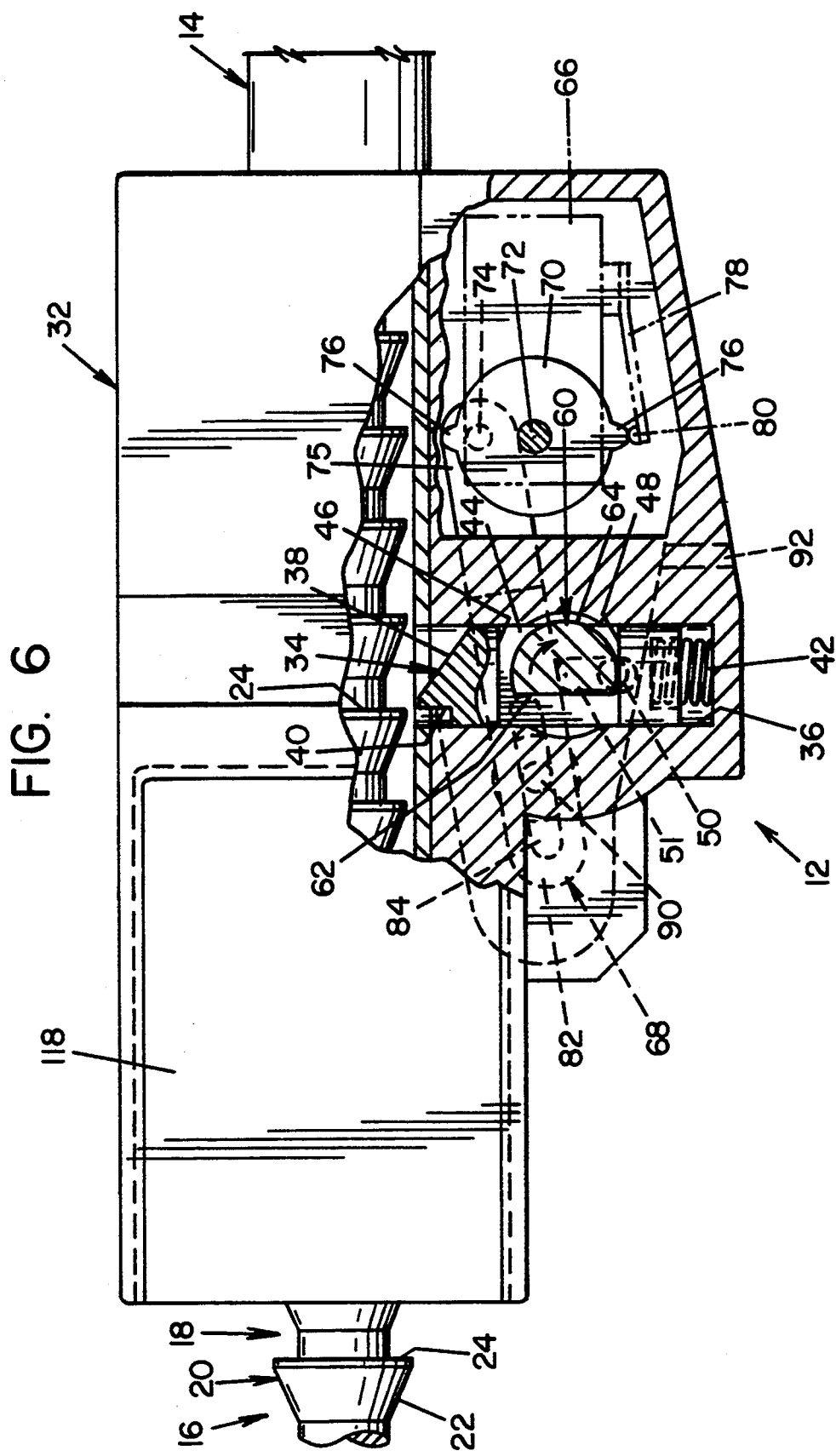
FIG. 6 is an elevation view, partially in section, similar to FIG. 2 and showing the latch member of the lock mechanism in its unlatched position.
Figure 8:
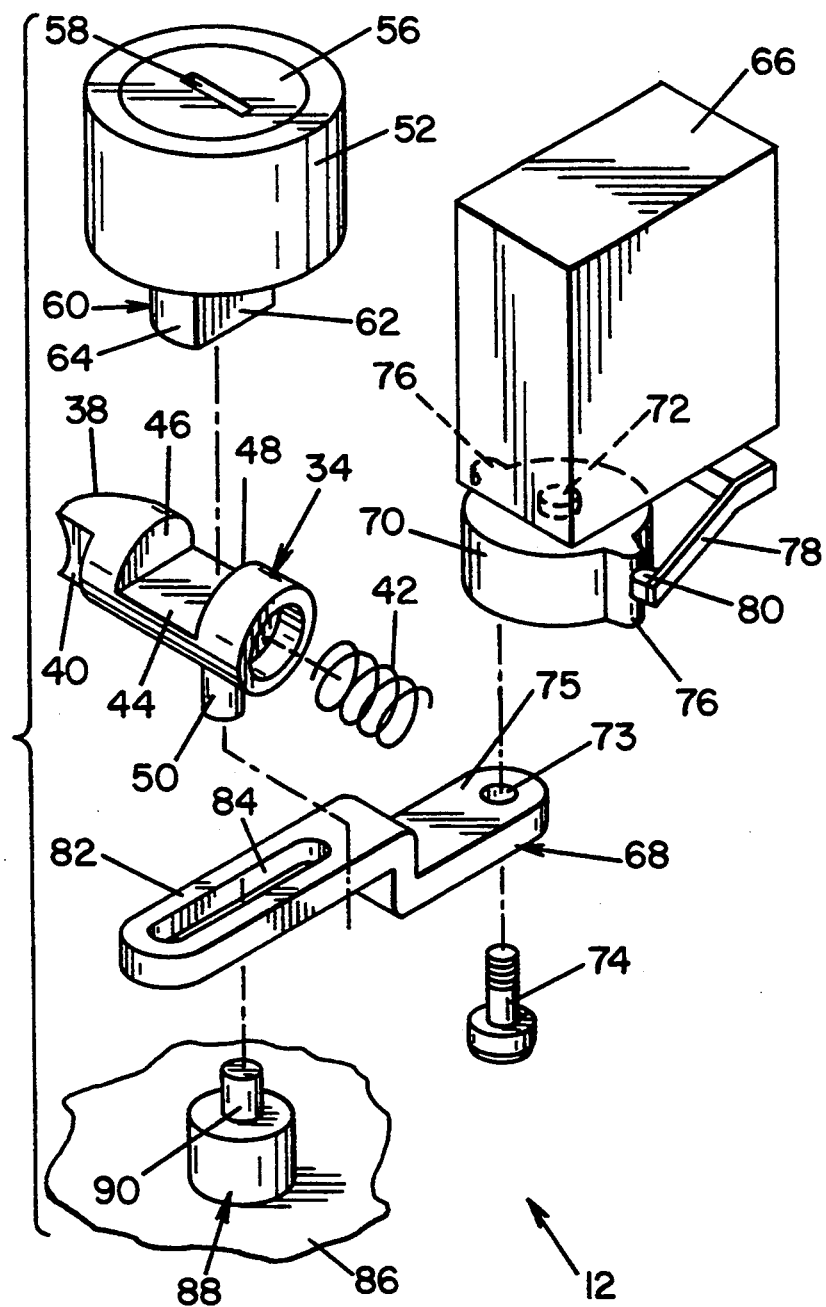
FIG. 8 is an exploded perspective view of the component parts of the lock mechanism.

When motor 66 is operated as described hereinafter to rotate disc 70 180° from the position shown in FIG. 2, lever 68 is pivoted relative to pin 90 to the position shown in FIG. 5. During such rotation of disc 70, leg 82 of lever 68 engages latch pin 50 and thus displaces latch member 34 downwardly from the position shown in FIG. 2 to the position shown in FIG. 5 against the bias of spring 42. It will be appreciated, therefore, that FIG. 5 illustrates the positions of the component parts in the unlocked mode of the lock mechanism resulting from the operation of motor 66. Again, the length of the slot in latch member 34 defined by end surfaces 46 and 48 enables the latch member to be displaced by the lever 68 to its unlatched position relative to tumbler cam 60. At the same time, it will be noted that latch member 34 is held in the unlatched position thereof by the engagement of lever 68 with latch pin 50 and that such engagement positions the slot in latch member 34 such that the end surfaces 46 and 48 thereof are spaced from tumbler cam 60. Accordingly, when the component parts of the lock mechanism are in the unlocked mode resulting from operation of motor 66, the key-operated tumbler cam is not operable to displace the latch member to its latched position relative to rod member 16.

Figure 7:
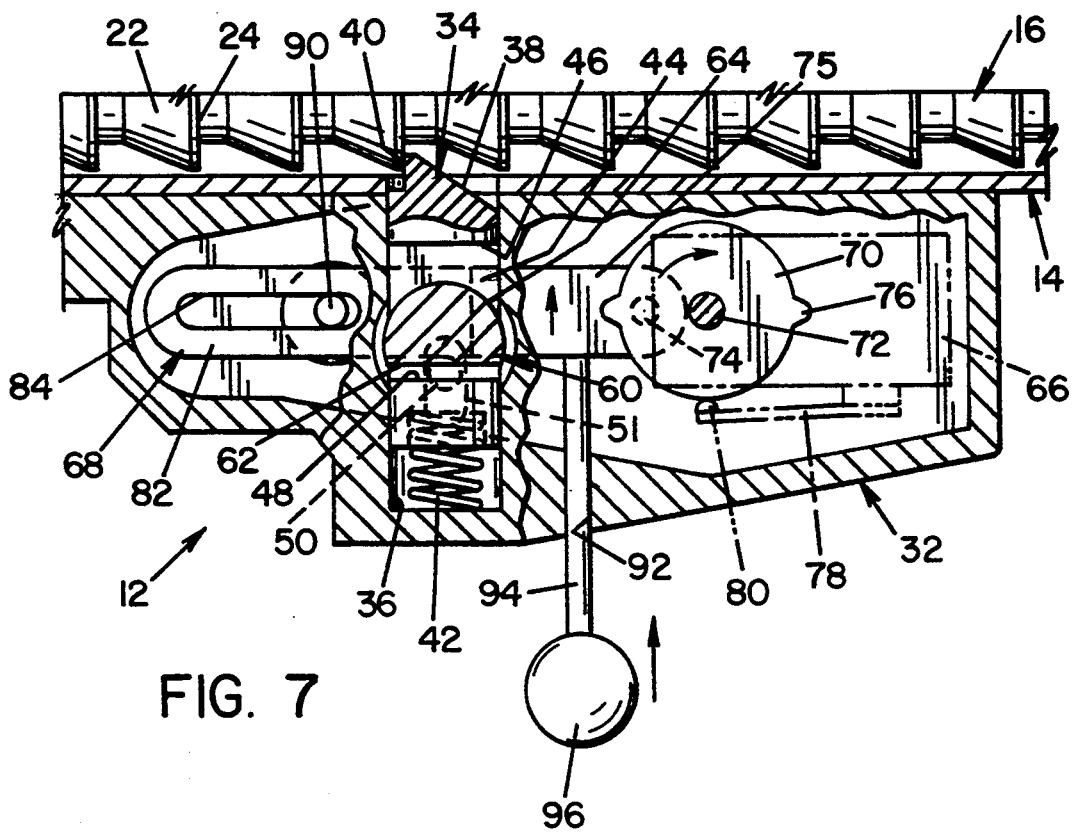
FIG. 7 is a detail view, in section, showing manual displacement of the component parts of the lock mechanism from the unlocked to the locked positions thereof.

It will be appreciated from the foregoing description that if motor 66 becomes disabled for any reason while the component parts of the lock mechanism are in the unlocked portions thereof shown in FIG. 5, it is impossible to lock rod member 16 of the steering wheel lock bar against displacement in the direction of retraction thereof and, accordingly, it is impossible to lock the steering wheel lock bar in place on the vehicle steering wheel. In order to enable locking the lock bar under these circumstances, provision is made for overriding motor 66 and manually displacing lever 68 of the motor-driven portion of the lock mechanism to the locked disposition thereof shown in FIG. 2. More particularly in this respect, as best seen in FIG. 7, housing 32 is provided with an opening 92 aligned with leg 75 of lever 68 toward the end thereof attached to disc 70. Opening 92 is adapted to receive a tool which, in the embodiment illustrated, includes a rod 94 provided with an operating knob 96 which facilitates introducing rod 94 into opening 92 and pushing upwardly against lever 68 so as to displace the lever and disc 70 from the positions thereof shown in FIG. 5 to the positions shown in FIG. 2, the intermediate positions of the components during such displacement being shown in FIG. 7. Such displacement of lever 68 releases latch member 34 for displacement to its latched position by spring 42. As will be appreciated from the foregoing description, when the component parts are in the positions shown in FIG. 2, latch member 34 is operable between the latched and unlatched positions thereof through key-operated tumbler cam 60.

Figure 4:
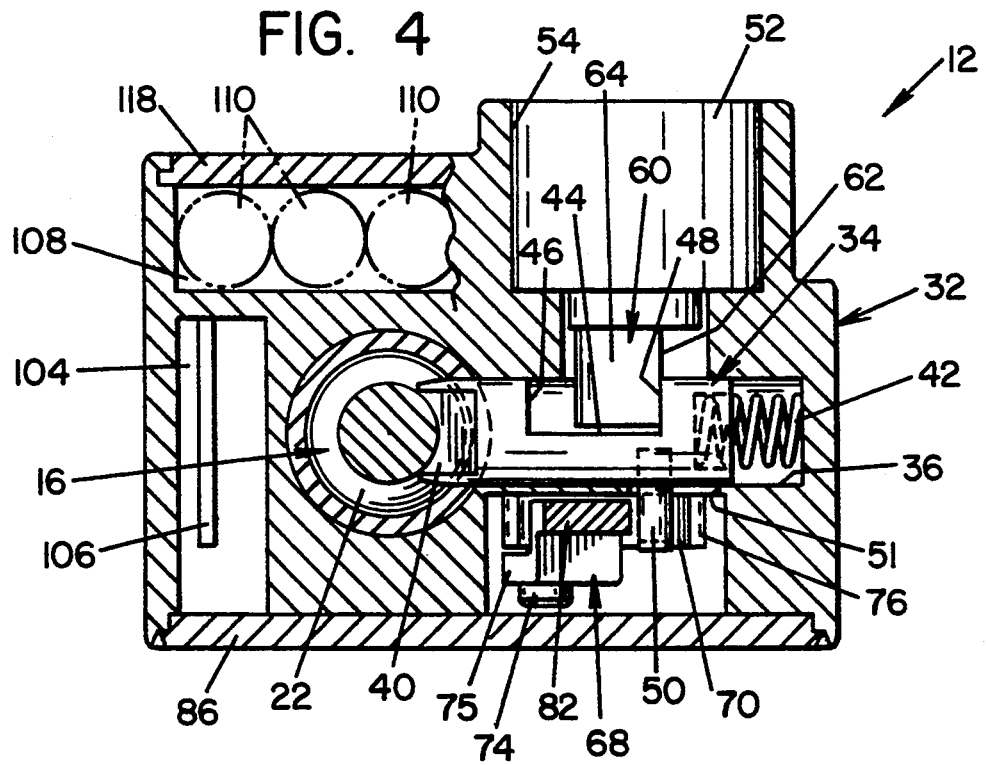
FIG. 4 is a cross-sectional elevation view of the lock housing taken along line 4—4 in FIG. 2.
Figure 9:
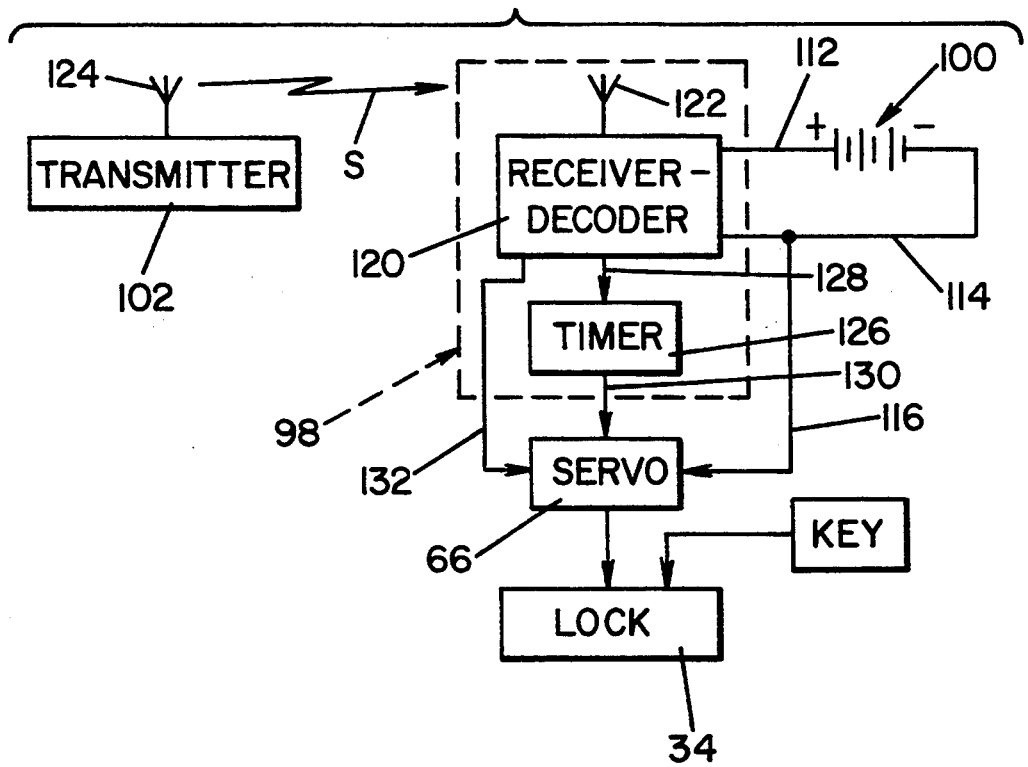
FIG. 9 is a block diagram showing the functions of the remote transmitter, control circuit and lock mechanism.

In accordance with the present invention, and as mentioned herein above, the motor-driven portion of lock mechanism 12 is adapted to be remotely controlled either passively or actively through the use of an encoder carried by the vehicle owner. With regard to such operation of the lock mechanism, reference is made in particular to FIG. 9 of the drawings wherein there is illustrated a control circuit 98 and power supply 100 for servo-motor 66, and a transmitter 102 for remotely activating control circuit 98 in a manner to achieve locking and unlocking displacement of latch member 34 through the operation of servo-motor 66. Control circuit 98 and power supply 100 are enclosed within lock housing 32 and, as best seen in FIGS. 2, 4 and 5 of the drawings, lock housing 32 includes a compartment 104 supporting and enclosing a circuit board 106 for the electrical components of control circuit 98, and a compartment 108 for power supply 100 which is provided by a plurality of batteries 110 in compartment 108. While not shown in the latter FIGURES, it will be appreciated from FIG. 9 that the batteries providing power supply 100 are connected to control circuit 98 by lines 112 and 114, and to servo-motor 66 by line 116 and the output of control circuit 98 as described hereinafter. Battery compartment 108 in housing 32 is closed by a removable cover 118 which facilitates access to the compartment for changing the batteries.

Referring again to FIG. 9, control circuit 98 includes a receiver-decoder 120 including an antenna 122 for receiving electromagnetic signals S from antenna 124 of transmitter 102 which is described in greater detail hereinafter. Control circuit 98 further includes a reset timer 126 which is part of a micro-processor, not shown, used in control circuit 98. In accordance with the preferred embodiment of the invention, transmitter 102 is a personal identification unit carried by the vehicle owner and which continuously transmits a series of electromagnetic coded signals S at short intervals, such as about 10 seconds. The coded signals are an arrangement of pulses unique to the particular transmitter, whereby the latter identifies an authorized operator of the vehicle. Receiver-decoder 120 of control circuit 98 has a decoding network for recognizing the unique coded pattern of signals S from transmitter 102, and the periodic transmission of signals S provides for control circuit 98 to be activated in accordance with the location of the transmitter 102 relative to the vehicle. In this respect, for example, if the operator of the vehicle is within 50 feet thereof, control circuit 98 will be activated by signals S whereas, if the operator is beyond 50 feet, transmitter 102 is outside the range of transmission of signals S for the purpose of activating control circuit 98. It will be appreciated of course that the range of transmission for transmitter 102 can vary in accordance with the strength of the battery therein, not shown, by which the transmitter is powered.

When the operator of the vehicle is within the vicinity thereof, control circuit 98 is activated to unlock lock mechanism 12. At this time, the component parts of the lock mechanism including the motor-driven portion thereof are in the positions shown in FIG. 5 of the drawings. Morever, control circuit 98 lock circuit 12 maintains in the unlocked condition so long as the operator remains within the vicinity of the vehicle. In this respect, signals S are transmitted to receiver-decoder 120 every 10 seconds, and the decoder, upon recognizing and acknowledging the unique coded signal from the transmitter transmits a signal through output 128 to reset timer 126 which has an expiration time greater than the 10 second period between signals S and which expiration time is, for example, 30 seconds. Each time reset timer 126 receives a signal from output 128, it resets to the full expiration time thereof. Consequently, if the operator remains in the vicinity of the vehicle, timer 126 continues to reset in response to signals S and the component parts remain in the positions thereof shown in FIG. 5.

When the vehicle operator leaves the vicinity of the vehicle, signals S are no longer received by receiver-decoder 120 and, accordingly, the 30 second expiration time of timer 126 expires without the timer receiving a reset signal from output 128. Consequently, timer 126 outputs a signal through line 130 to servo-motor 66 connecting the servo-motor across power supply 100 for a period of time sufficient to drive disc 70 180° clockwise in FIG. 5 to shift lever 68 from the position shown in the latter figure to the position shown in FIG. 2. This relieves latch 34 for displacement to its latched position relative to rod member 16 by biasing spring 42 to place the lock mechanism in the locked mode thereof. As disc 70 approaches the point of 180° rotation, servo-motor 66 is deenergized and nose 76 on disc 70 interengages with spring biased nose 80 and the frictional engagement therebetween assures stopping of disc 70. When the vehicle owner subsequently moves back into the vicinity of the vehicle, the first signal S received by receiver-decoder 120 is outputted through timer 126 via line 130 to servo-motor 66 again connecting the latter across power supply 100. Accordingly, disc 70 is rotated 180° clockwise to shift lever 68 from the position thereof shown in FIG. 2 back to the position shown in FIG. 5, whereby lever 68 engages latch pin 50 and displaces latch 34 to the unlatched position thereof against the bias of spring 42. Thus, the lock mechanism is again in the unlocked mode thereof. Rotation of disc 70 is again arrested by the frictional interengagement between the corresponding nose 76 on disc 70 and the spring biased nose 80. Subsequent signals S received by receiver-decoder 120 and outputted through line 128 to timer 126 operate as described hereinabove to reset the timer, whereby the lock mechanism remains in the unlocked mode until such time as the operator again leaves the vicinity of the vehicle.

Optionally, as will become apparent hereinafter, transmitter 102 is provided with a selectively operable pushbutton override to provide for manually or actively controlling operation of lock mechanism 12 through control circuit 98. In this respect, manual depression of the pushbutton by the vehicle owner provides for continuous transmission of signals S to receiver-decoder 120 as opposed to the periodic signals transmitted when the transmitter is operated in the passive mode as described hereinabove. A continuous signal S from the transmitter, after decoding and acceptance by receiver-decoder 120, is outputted by the micro-processor through line 132 directly to servo-motor 66, thus bypassing timer 126, whereby the servo-motor is connected across power supply 100 and operates to rotate disc 70 180° to shift the lock mechanism from one of the locked and unlocked modes thereof to the other. Transmitter 102 can be provided with a switch, for example, for shifting the transmitter between the active and passive modes of operation thereof and, when in the active mode, sequential signals S are operable through control circuit 98 to sequentially shift the lock mechanism between the two modes thereof. It will be appreciated, of course, that transmitter 102 has to be within the transmitting range thereof in the active mode in order for the signals to be received by receiver-decoder 120.

Figure 10:
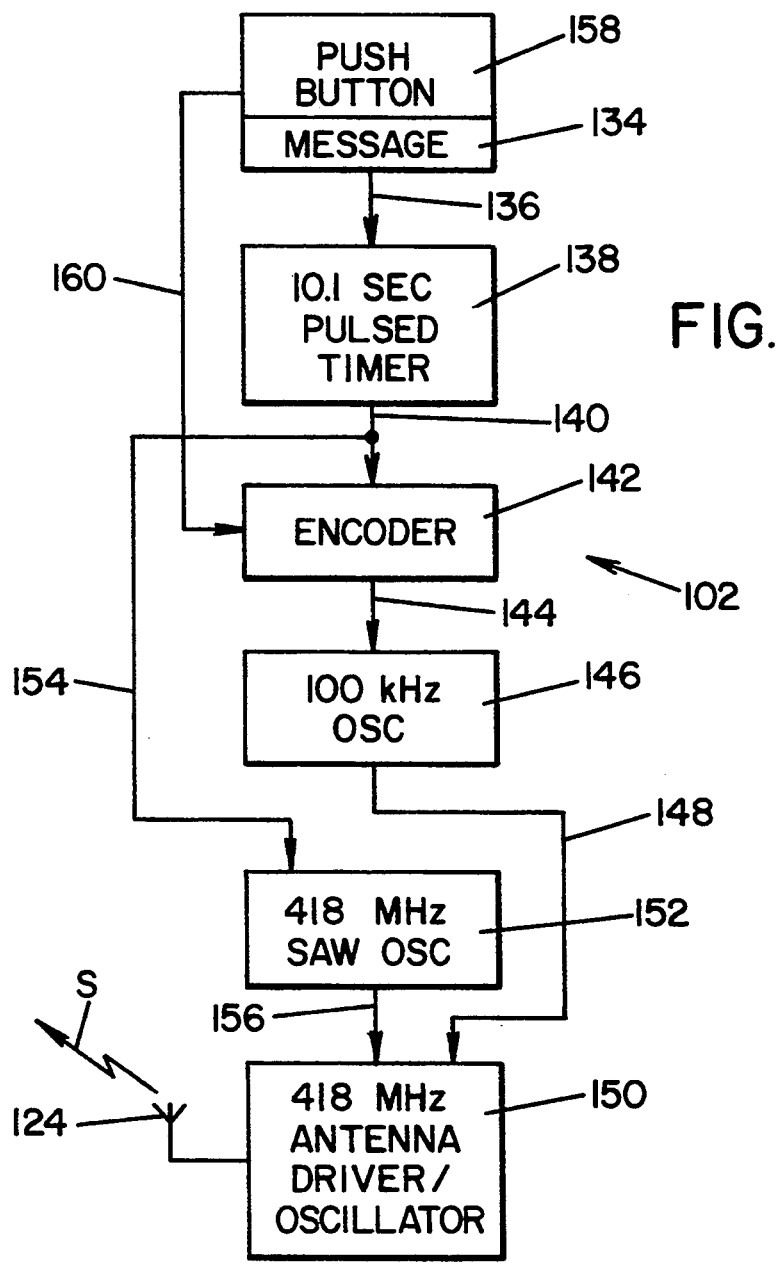
FIG. 10 is a block diagram showing the electrical components of the preferred embodiment of the transmitter of the present invention.
Figure 11:
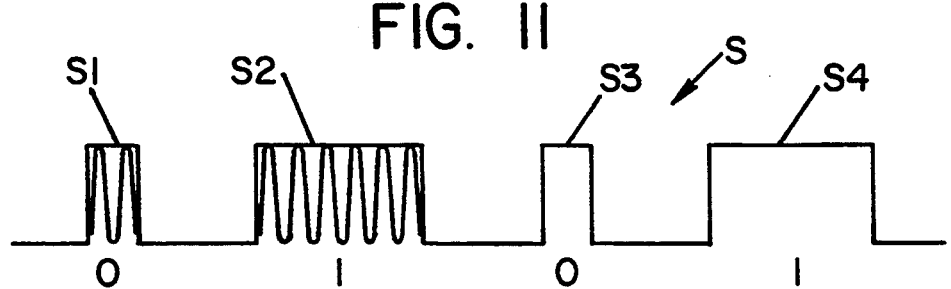
FIG. 11 represents a coded transmitted signal created by the transmitter depicted in FIG. 10.

A preferred embodiment of the personal identification unit or transmitter 102 is illustrated in FIG. 10 of the drawings wherein the first stage is representative of the optional active or passive operation thereof with respect to transmitting signals S, and which active and passive modes are respectively designated "pushbutton" and "message". It will be appreciated that the components of transmitter 102 are powered by an internal battery, not shown. Considering first the passive mode of operation, the "message" stage 134 creates a continuous signal in line 136 to a pulse timer 138. Pulse timer 138 creates a signal in line 140 each 10 seconds. This signal is converted to the desired unique coded signal for the personal identification unit by encoder 142 to produce a series of binary signals which are directed through line 144 to a 100 kHz oscillator 146. The output of oscillator 146 is a series of small or long pulses indicative of the logic 0 and a logic 1, respectively, of a binary coded signal. The coded signal is directed through line 148 to an antenna driver oscillator 150 so that each 10 seconds an electromagnetic coded signal S unique to the transmitter is transmitted from antenna 124 thereof. Output 140 from pulse timer 138 also enables a 418 MHz SAW oscillator 152 through line 154. The output of oscillator 152 is applied to oscillator 150 through line 156 and provides antenna 124 with a carrier having a frequency of 418 MHz to prevent radio interference. The resulting signal is a 100 kHz decoded serial signal with a 418 MHz carrier, and this signal occurs each 10 seconds to reset timer 126 when transmitter 102 is within the vicinity of the vehicle and thus control circuit 98 as described hereinabove. The signal S produced in the foregoing manner is shown in FIG. 11 and has a series of binary numbers defined by short pulses S1, S3 and long pulses S2 and S4.

In the active or "pushbutton" mode, pushbutton 158 is operable to transmit a continuous signal through line 160 directly to encoder 142, thus bypassing pulse timer 138. Accordingly, it will be appreciated that when transmitter 102 is used in the active mode, signal S is transmitted from antenna 124 for whatever period of time pushbutton 158 is depressed by the operator.

Figure 12:
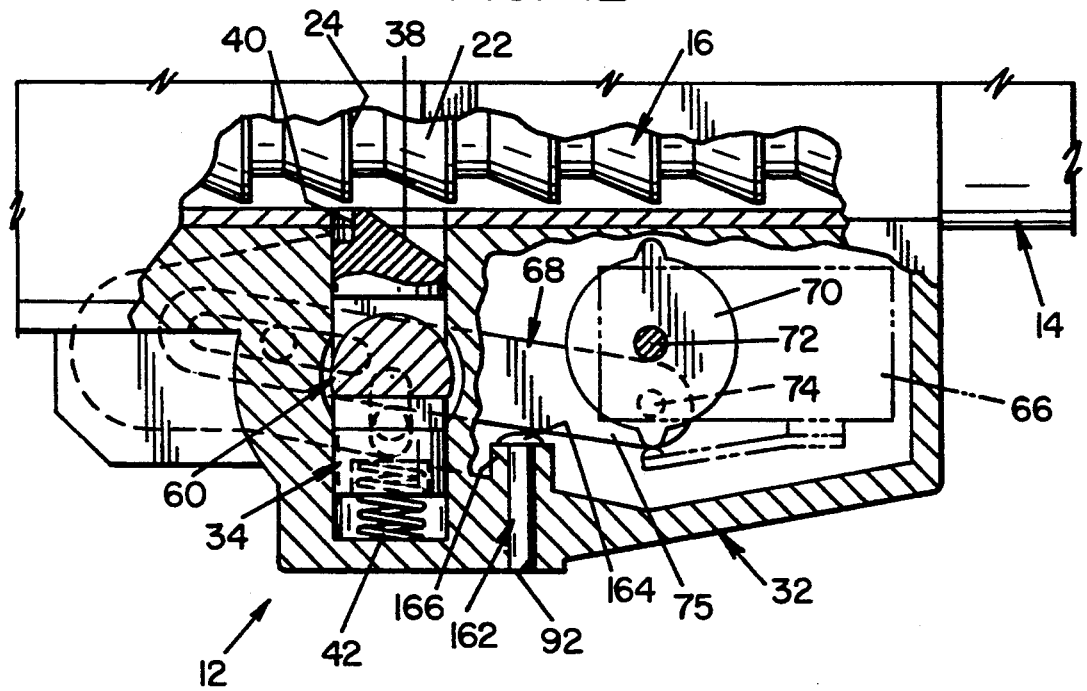
FIGS. 12 and 13 are detailed sectional elevation views similar to FIG. 7 and showing another arrangement for manually displacing the component parts of the lock mechanism between the unlocked and locked positions thereof.
Figure 13:
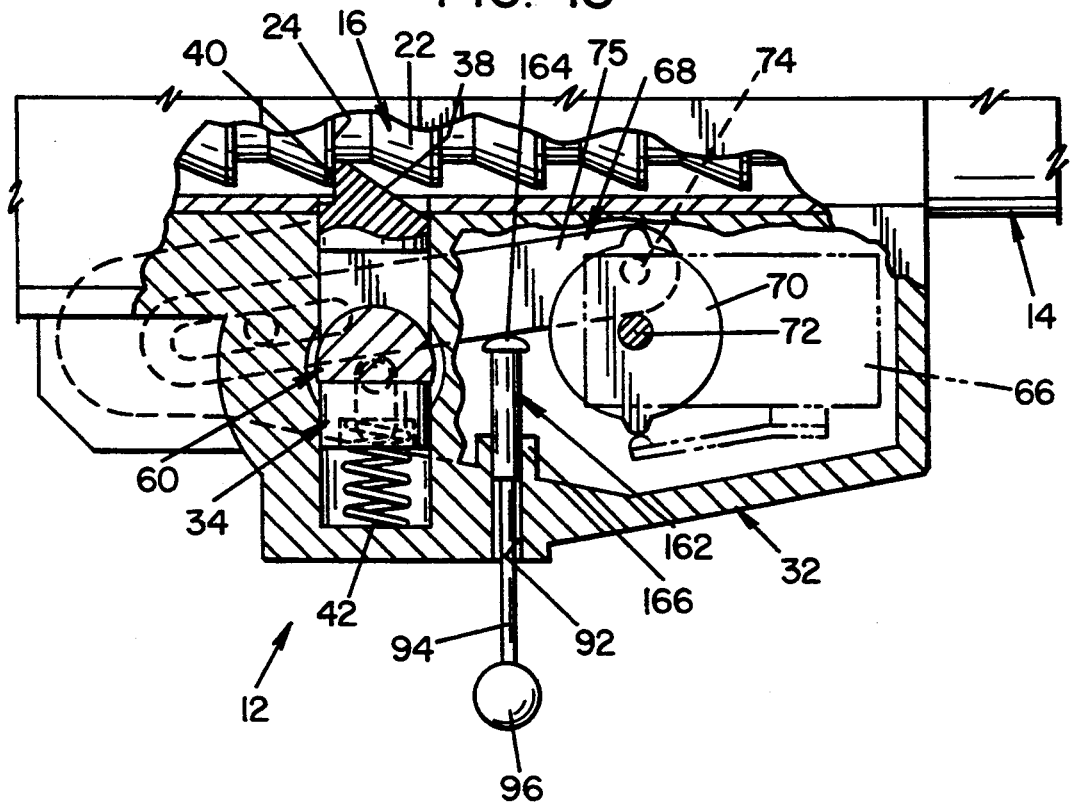

Referring now to FIGS. 12 and 13 of the drawings, there is illustrated a modification of the arrangement discussed hereinabove in conjunction with FIG. 7 for manually displacing motor-driven lever 68 from the unlocked to the locked position thereof in the event motor 66 becomes disabled. In this embodiment, opening 92 in lock housing 32 receives a pin 162 having a head 164 on the inner end thereof. The interior of housing 32 is provided with a tubular projection 166 having a flat inner end against which head 164 engages to retain the pin in opening 92, as shown in FIG. 12. Pin 162 is adapted to be displaced inwardly of housing 32 by tool 94, as shown in FIG. 13, so as to engage and displace lever 68 from the unlocked position shown in FIG. 12 to the locked position shown in FIG. 13. As will be appreciated from FIGS. 12 and 13, pin 162 is retained in opening 92 at all times. This advantageously precludes a would-be thief from introducing a hooked wire or the like through opening 92 and about the upper edge of lever 68 so as to pull the lever back to the unlocked position thereof and which would be possible if opening 92 were not plugged by pin 162.

Figure 14:
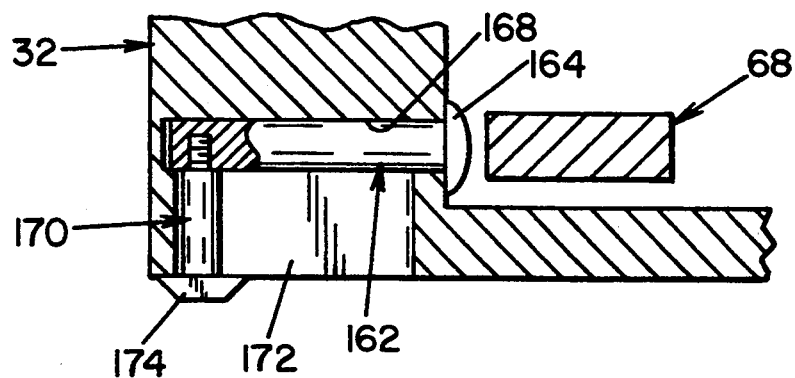
FIGS. 14 and 15 are detailed views, in section, showing a modification of the arrangement in FIGS. 12 and 13 for manually displacing the component parts of the lock mechanism.
Figure 15:
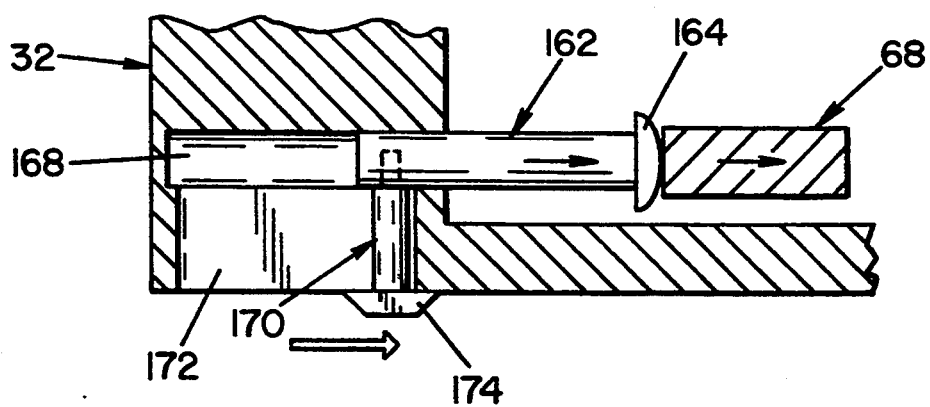

FIGS. 14 and 15 of the drawings illustrate a modification of the pin arrangement shown in FIGS. 12 and 13. In this respect, pin 162 is slidably received in an opening 168 which is closed at the end thereof adjacent the outer surface of housing 32, and the pin is provided with an operating member 170 extending transversely therefrom and through a slot 172 in housing 32. Slot 172 extends axially of pin 162, and the outer end of operating member 170 is provided with a button 174 which facilitates manual displacement of pin 162 to the right from the position shown in FIG. 14 to the position shown in FIG. 15. From the foregoing description, it will be appreciated that such displacement of pin 162 displaces lever 68 from the unlocked to the locked disposition thereof.

Figure 16:
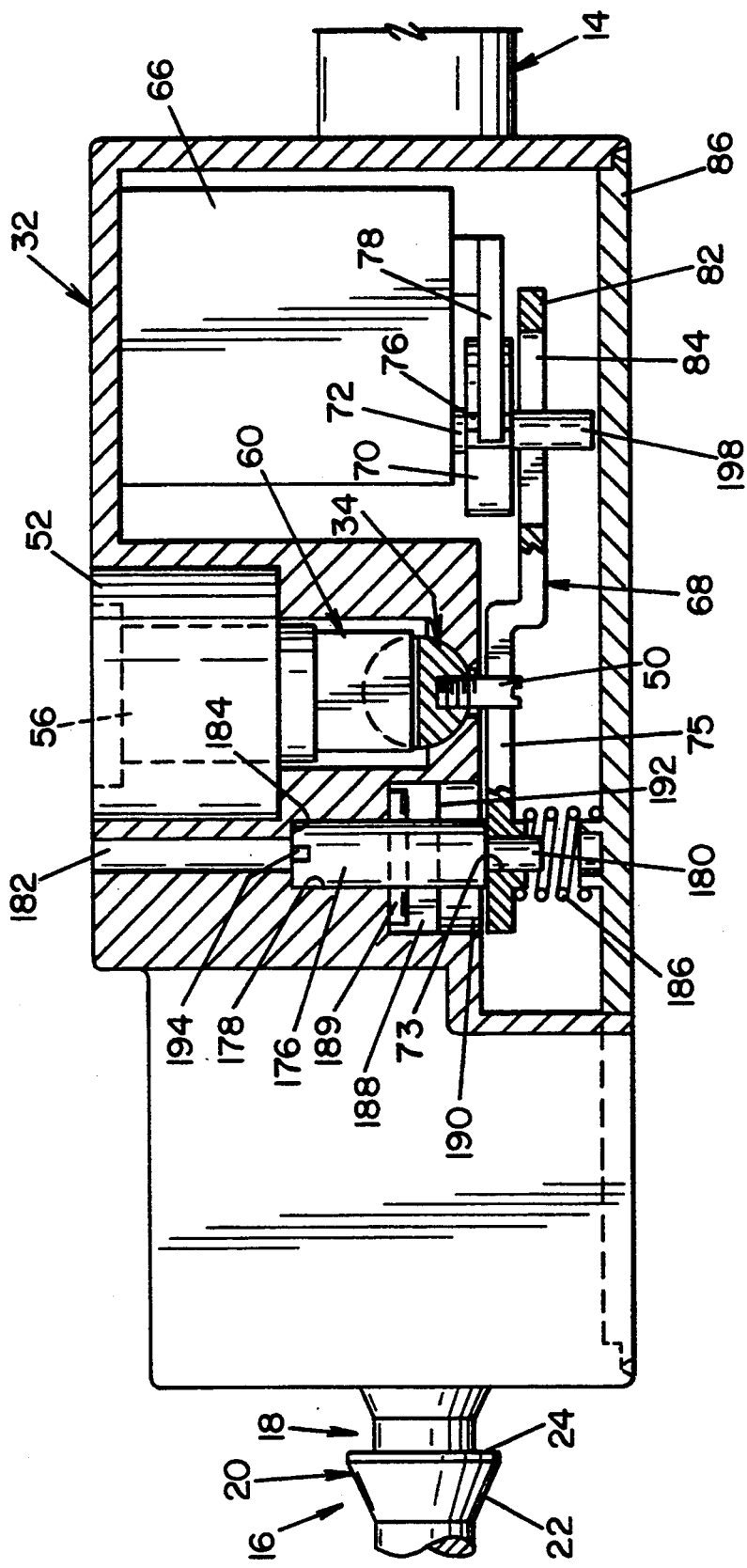
FIG. 16 is a cross-sectional view of the lock housing, similar to FIG. 3, and showing another embodiment of the motor-driven latch actuating mechanism.
Figure 17:
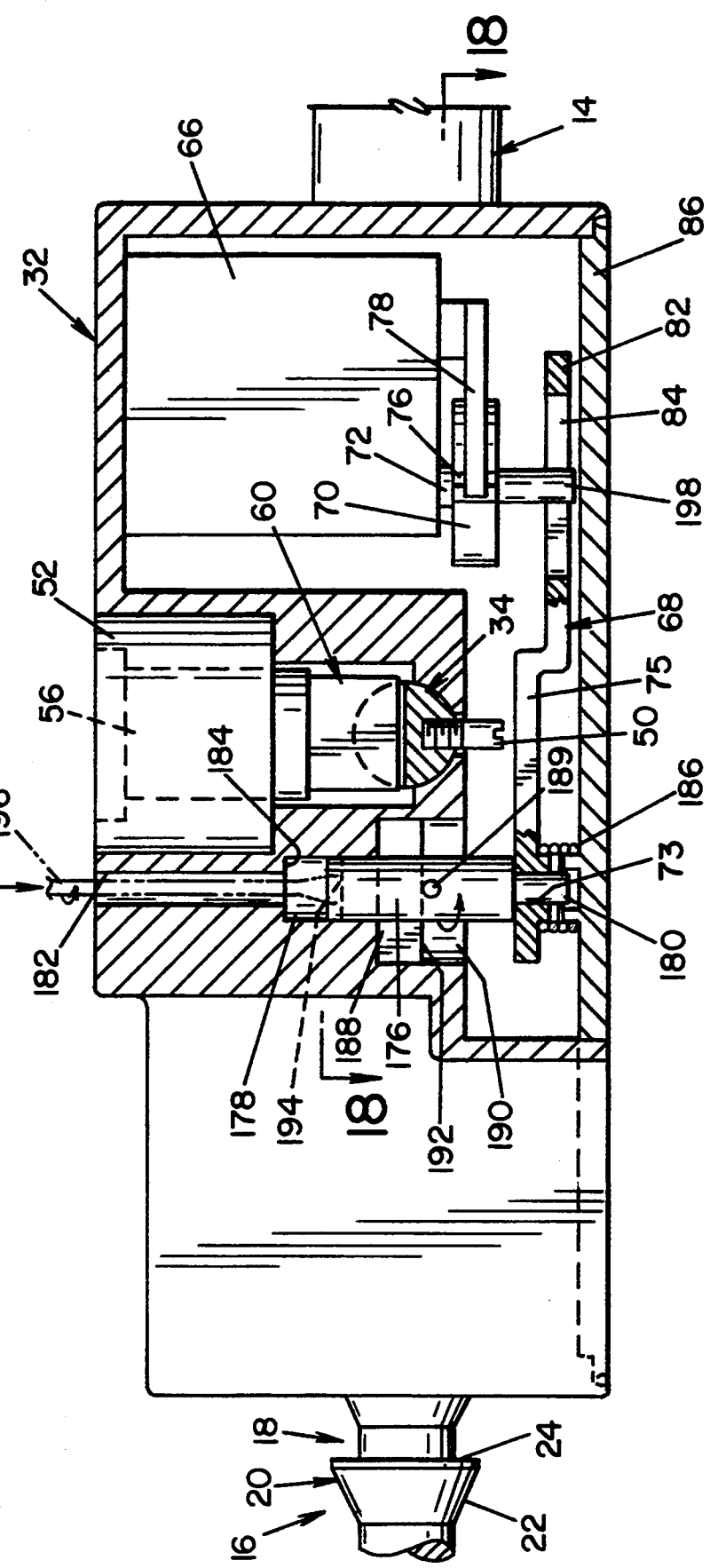
FIG. 17 is a sectional view similar to FIG. 16 and showing the component parts of the motor-driven latch actuating mechanism in the disabled positions thereof.
Figure 18:
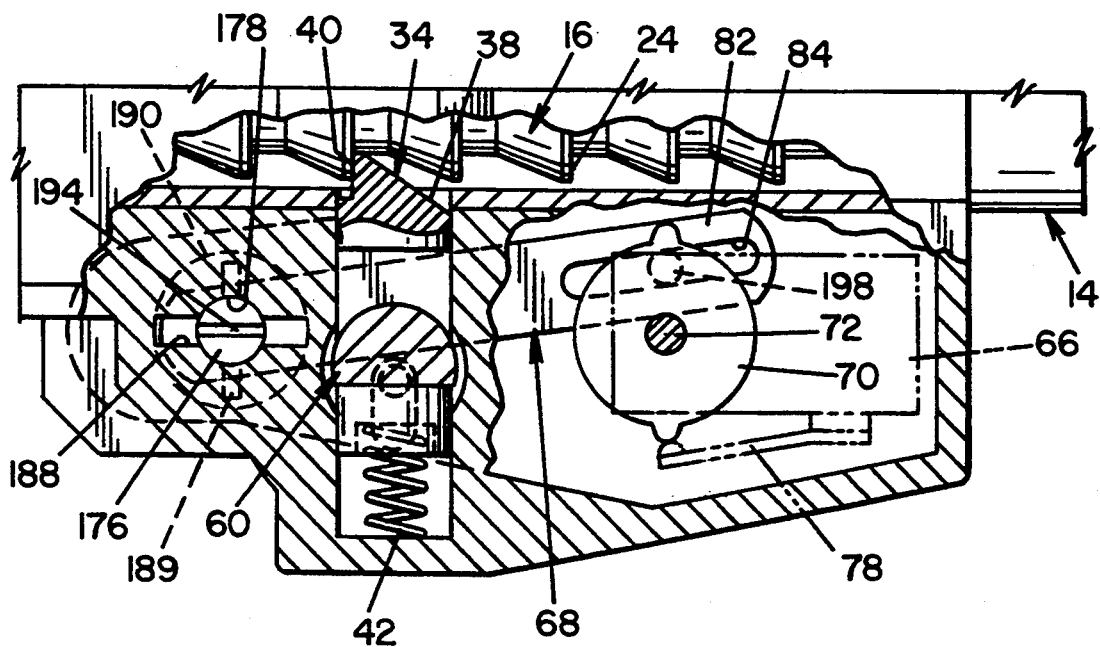
FIG. 18 is a cross-sectional view of the component parts of the lock mechanism taken along line 18—18 in FIG. 17.

FIGS. 16–18 illustrate a preferred mounting arrangement for the motor-driven lever and by which the lock mechanism is selectively shiftable between motor-driven and keyoperated modes. This embodiment advantageously enables shifting the motor-driven portion of the lock mechanism to a disabled position with respect to actuating the latch member of the lock mechanism regardless of whether or not the servo-motor is disabled. Accordingly, should the vehicle operator lose the personal identification encoder, or should the encoder be stolen, he or she can shift the lock mechanism to the key-operating mode in which the motor-driven portion of the lock mechanism is disabled, whereby the operator can lock and unlock the mechanism through the use of a key while assuring against remote operation of the lock mechanism by an unauthorized person who finds or steals the encoder.

The foregoing advantages are achieved in accordance with this embodiment by reversing lever 68 for the slot 84 in leg 82 thereof to be adjacent motor-driven disc 70 and to provide for leg 75 thereof to extend across latch pin 50 to the extent that opening 73 in leg 75 is approximately in the location of guide pin 90 in the embodiment of FIGS. 1–8. In this embodiment, lever 68 is mounted on housing 32 by means of a support pin having a large diameter portion 176 axially and rotatably received in a bore 178 in the housing, and having a small diameter portion 180 extending through opening 73 in leg 75, whereby lever 68 is pivotal about the axis of pin portion 180. A bore 182 of smaller diameter than bore 178 opens into the outer end thereof to provide a shoulder 184 therebetween. Lever 68 abuts against the shoulder between the large and the small diameter portions 176 and 180 of the support pin, and lever 68 is biased against this shoulder and the support pin is biased against shoulder 184 by a coil spring 186 coaxial with the support pin and interposed between leg 75 of the lever and housing cover 86. The axially inner end of bore 178 is provided with a transverse slot 188 and an axially adjacent circular bore 190 providing a shoulder 192 transverse to slot 188, portion 176 of the support pin is provided with a cross pin 189, and the axially outer end of support pin portion 176 is provided with a transverse slot 194. For the purpose set forth hereafter, the support pin is adapted to be axially depressed and rotated relative to housing 32. Motor-driven disc 70 is provided with an elongated pin 198 extending through slot 84 in leg 82 of lever 68, and pin 198 is radially spaced from motor drive shaft 72, whereby disc 70 and pin 198 provide a crank for pivoting lever 68 in opposite directions about support pin portion 180 in response to the operation of motor 66. Pin 198 extends outwardly from disc 70 to a point adjacent cover 86.

In the positions of the component parts shown in FIG. 16, leg 75 of lever 68 transversely overlies latch pin 50, whereby it will be appreciated from the description of the embodiment illustrated in FIGS. 1–8 that latch spring 42 biases latch member 34 toward the latched position thereof and that lever 68 is cooperable with spring 42 and in response to rotation of disc 70 to alternately displace the latch member between the latched and unlatched positions thereof relative to rod member 16 of the steering wheel lock bar. Should motor 66 become disabled, or should the vehicle operator lose or have the personal identification encoder stolen, or should the operator simply desire to be able to lock and unlock the lock mechanism through the use of the key-operated portion thereof only, the motor-driven portion of the lock mechanism in the embodiment shown in FIGS. 16–18 is adapted to be manually disabled. This is achieved simply by introducing a screwdriver 196 into bore 182 and into engagement with slot 194 in the support pin, as shown in FIG. 17, pushing the support pin axially inwardly to move cross pin 189 out of slot 188 and into opening 190, and then rotating the support pin 90° from the position shown in FIG. 16 to the position shown in FIG. 17. In the latter position, pin 189 engages shoulder 192 to retain lever 68 in the position shown in FIG. 17 against the bias of spring 186. In this position of the component parts, leg 82 of lever 68 is adjacent the outer end of pin 198 and leg 75 of the lever is spaced axially outwardly from latch pin 50. Accordingly, even if motor 66 is actuated with the component parts in the position shown in FIG. 17, the spacing of lever leg 75 from latch pin 50 precludes any displacement of the latch member as a result of the pivotal displacement of lever 68 by motor 66. When the operator chooses to return the lock mechanism to the remotely controllable motor-operated mode, this is easily and quickly achieved by inserting screwdriver 196 into bore 182, rotating the support pin 90° from the position shown in FIG. 17 so as to align pin 189 with slot 188, and then releasing the screwdriver whereupon spring 186 biases the component parts from the positions shown in FIG. 17 back to the positions shown in FIG. 16. When the motor-driven portion of the lock mechanism in this embodiment is in the remotely controllable mode, as shown in FIG. 16, operation of the latch mechanism through use of remote transmitter 102 is as described hereinabove in conjunction with the embodiment shown in FIG. 1–8. As will be appreciated from FIG. 18, this includes the ability to displace latch member 34 from the latched to the unlatched position thereof through the use of the key-operated tumbler cam when the component parts of the motor-operated portion of the lock mechanism are in the locked positions.

While considerable emphasis has been placed herein on the structures and structural relationships between the component parts of preferred embodiments of the invention, it will be appreciated that other embodiments of the invention can be made and that many changes can be made in the embodiments herein disclosed without departing from the principals of the present invention. Accordingly, it is to be distinctly understood that the foregoing descriptive matter is to be interpreted merely as illustrative of the present invention and not as a limitation.

Having thus described the invention it is claimed:

1. In a vehicle anti-theft device mountable in a vehicle to limit rotation of the vehicle steering wheel and comprising first and second members including means for mounting said device in a vehicle, said first and second members being relatively displacable between mounted and dismounted positions, and lock means including a latch member having locked and unlocked positions relative to said first and second members, said lock means including manually operable means for displacing said latch member between said locked and unlocked positions, said latch member in said locked position locking said first and second members in said mounted position against relative displacement toward said dismounted position, the improvement comprising: said lock means further including electric motor means for displacing said latch member between said locked and unlocked positions independent of said manually operable means, and control means for operating said motor means.

2. The improvement according to claim 1, wherein said control means includes signal receiver means in said device and signal transmitter means remote from said device.

3. The improvement according to claim 2, wherein said transmitter means has a range of signal transmission relative to said receiver means, and said receiver means includes means to operate said motor means for displacing said latch member to said locked position when said transmitter means is beyond said range of transmission and to displace said lock means to said unlocked position when said transmitter means is within said range.

4. The improvement according to claim 2, wherein said transmitter means transmits signals periodically and said receiver means includes means operable when said transmitter means is within said range of transmission to preclude operation of said motor means to displace said latch member from said unlocked to said locked position.

5. The improvement according to claim 1, wherein said latch member is on said first member and said lock means further includes latch keeper means on said second member, said latch member being displacable between latched and unlatched positions relative to said keeper means corresponding respectively to said locked and unlocked positions of said latch member, and said means for displacing said latch member including a latch actuator driven by said motor means to displace said latch member from said latched to said unlatched position.

6. In a vehicle anti-theft device mountable in a vehicle to limit rotation of the vehicle steering wheel and comprising first and second members including means for mounting said device in a vehicle, said first and second members being relatively displacable between mounted and dismounted positions, and lock means having locked and unlocked positions relative to said first and second members, said lock means in said locked position locking said first and second members in said mounted position against relative displacement toward said dismounted position, the improvement comprising: means including electric motor means for displacing said lock means between said locked and unlocked positions, and control means for operating said motor means, said lock means including a latch on said first member and latch keeper means on said second member, said latch being displacable between latched and unlatched positions relative to said keeper means corresponding respectively to said locked and unlocked positions of said lock means, said means for displacing said lock means including a latch actuator driven by said motor means to displace said latch from said latched to said unlatched position, said latch actuator including a lever pivotally supported on said first member, said motor means pivoting said lever between first and second lever positions in which said latch is respectively in said latched and unlatched positions.

7. The improvement according to claim 6, wherein said means for displacing said lock means includes a spring biasing said latch toward said latched position.

8. The improvement according to claim 6, wherein said first member includes housing means enclosing said latch, lever, and motor means, and an opening in said housing means for accessing said lever for manual displacement thereof from said second to said first position.

9. The improvement according to claim 8, wherein said lever is pivotal in a plane and said opening is parallel to said plane.

10. The improvement according to claim 8, and a pin reciprocably supported in said opening and having an inner end in said housing means positioned to engage and displace said lever from said second to said first position upon displacement of said pin inwardly relative to said housing means.

11. The improvement according to claim 10, and a manually operable actuator member attached to said pin and having an end exposed outside said housing means for displacing said pin relative to said opening.

12. The improvement according to claim 6, wherein said latch includes a latch pin engaged by said lever to displace said latch to said unlatched position during pivoting of said lever from said first to said second position thereof.

13. The improvement according to claim 12, wherein said means for displacing said lock means includes a spring biasing said latch toward said latched position.

14. The improvement according to claim 13, wherein said latch is displaceable relative to said lever from said latched position toward said unlatched position when said lever is in said first position thereof.

15. The improvement according to claim 5, wherein said means for displacing said latch member includes a spring biasing said latch member toward said latched position.

16. The improvement according to claim 5, wherein said manually operable means for displacing said latch member includes a rotatable key operated tumbler on said first member, and means including interengaging means on said tumbler and latch member for displacing said latch member between said latched and unlatched positions in response to rotation of said tumbler.

17. The improvement according to claim 16, and means selectively operable to displace said latch actuator to an inoperative position with respect to displacing said latch member.

18. The improvement according to claim 16, wherein said latch actuator is driven by said motor means between first and second positions respectively corresponding to said latched and unlatched positions of said latch member, and means for disabling said tumbler from displacing said latch member when said latch actuator is in said second position.

19. The improvement according to claim 18, wherein said interengaging means includes cam means on said tumbler and cam follower means on said latch member, said cam means and follower means in said second position of said latch actuator being disengaged to preclude displacement of said latch member in response to rotation of said tumbler.

20. The improvement according to claim 19, wherein said means for displacing said latch member between said latched and unlatched positions includes a spring biasing said latch member toward said latched position.

21. The improvement according to claim 20, wherein said latch member in said first position of said latch actuator is displaceable relative to said tumbler between said latched and unlatched positions thereof.

22. The improvement according to claim 21, wherein said cam means and said cam follower means in said first position of said latch actuator interengage upon rotation of said tumbler to displace said latch member from said latched to said unlatched position against the bias of said spring.

23. The improvement according to claim 18, wherein said means for disabling said tumbler includes means providing a surface on said latch member engaged by said latch actuator to displace said latch member to said unlatched position during displacement of said latch actuator from said first to said second position thereof, said interengaging means on said tumbler and latch member being disengaged in said second position of said latch actuator to preclude displacement of said latch member in response to rotation of said tumbler.

24. The improvement according to claim 23, and means selectively operable to displace said latch actuator to an inoperative position with respect to engaging said surface on said latch member whereby said latch member is displaceable between said latched and unlatched positions by rotation of said tumbler.

25. In a vehicle anti-theft device mountable in a vehicle to limit rotation of the vehicle steering wheel and comprising first and second members including means for mounting said device in a vehicle, said first and second members being relatively displacable between mounted and dismounted positions, and lock means having locked and unlocked positions relative to said first and second members, said lock means in said locked position locking said first and second members in said mounted position against relative displacement toward said dismounted position, the improvement comprising: means including electric motor means for displacing said lock means between said locked and unlocked positions, and control means for operating said motor means, said lock means including a latch on said first member and latch keeper means on said second member, said latch being displacable between latched and unlatched positions relative to said keeper means corresponding respectively to said locked and unlocked positions of said lock means, said means for displacing said lock means including a latch actuator driven by said motor means to displace said latch from said latched to said unlatched position and a rotatable key operated tumbler on said first member, means including interengaging means on said tumbler and latch for displacing said latch between said latched and unlatched positions in response to rotation of said tumbler, said latch actuator being driven by said motor means between first and second positions respectively corresponding to said latched and unlatched positions of said latch, and means for disabling said tumbler from displacing said latch when said latch actuator is in said second position, said means for disabling said tumbler including means providing a surface on said latch engaged by said latch actuator to displace said latch to said unlatched position, and means selectively operable to displace said latch actuator to an inoperative position with respect to engaging said surface on said latch.

26. The improvement according to claim 25, wherein said means providing a surface on said latch is a latch pin having a pin axis, said latch actuator including a lever pivotal about a lever axis parallel to said pin axis, and said selectively operable means including means to displace said lever axially of said lever axis and relative to said latch pin.

27. The improvement according to claim 26, and pivot pin means mounting said lever on said first member for pivotal displacement about said lever axis, said pivot pin means having first and second axial positions relative to said first member, said lever being positioned to engage said latch pin in said first pivot pin position and to be axially spaced from said latch pin in said second pivot pin position.

28. The improvement according to claim 27, further including a spring biasing said pivot pin toward said first position thereof, and means to releasably hold said pivot pin in said second position thereof against the bias of said spring.

29. The improvement according to claim 28, wherein said means to hold said pivot pin includes interengaging means on said pivot pin and said first member.

30. A vehicle anti-theft device mountable in a vehicle to limit rotation of the vehicle steering wheel comprising, a tubular body including a housing and first attachment means, a grooved rod slidably received in said body and housing and including second attachment means spaced from said first attachment means, lock means in said housing for locking said rod against displacement relative to said body and housing in the direction to decrease the space between said first and second attachment means, said lock means including a latch member displacable between latched and unlatched positions relative to said grooved rod, manually operable means for displacing said latch member between said latched and unlatched positions, means including electrically operated motor means in said housing for displacing said latch member between said latched and unlatched positions independent of said manually operable means, motor control circuit means in said housing for activating and deactivating said motor means, said circuit means including control signal receiver means, and signal transmitter means remote from said device for transmitting control signals to said receiver means.

31. A vehicle anti-theft device mountable in a vehicle to limit rotation of the vehicle steering wheel comprising, a tubular body including a housing and first attachment means, a grooved rod slidably received in said body and housing and including second attachment means spaced from said first attachment means, lock means in said housing for locking said rod against displacement relative to said body and housing in the direction to decrease the space between said first and second attachment means, said lock means including a latch member displacable between latched and unlatched positions relative to said grooved rod, means including electrically operated motor means in said housing for displacing said latch member between said latched and unlatched positions, motor control circuit means in said housing for activating and deactivating said motor means, said circuit means including control signal receiver means, and signal transmitter means remote from said device for transmitting control signals to said receiver means, said means for displacing said latch member including spring means biasing said latch member toward said latched position, a lever supported in said housing for pivotal displacement between first and second positions, a crank driven by said motor means to pivot said lever between said first and second positions, said spring means in said first lever position biasing said latch member to said latched position, and said lever in moving from said first to said second position thereof displacing said latch member to said unlatched position thereof against the bias of said spring means.

32. The device according to claim 31, wherein said transmitter means has a range of signal transmission relative to said receiver means and said receiver means includes means to operate said motor means to displace said crank and said lever for said spring means to bias said latch member to said latched position when said transmitter means is beyond said range of transmission and to displace said crank for said lever to move said latch member to said unlatched position when said transmitter means is within said range.

33. The device according to claim 32, wherein said transmitter means transmits signals periodically and said receiver means includes means operable when said transmitter means is within said range of transmission to preclude operation of said motor means.

34. The device according to claim 31, and means independent of said motor means for manually displacing said crank and said lever from said second lever position to said first lever position.

35. The device according to claim 31, and means in said housing for disabling said lever from displacing said latch member to said unlatched position.

36. The device according to claim 31, wherein said lock means includes a key operated rotatable tumbler cam and said latch member includes a cam follower surface interengaging with said cam, said spring means biasing said follower surface toward said cam, and said spring means and said cam being operable in said first lever position to displace said latch member between said latched and unlatched positions in response to rotation of said cam.

37. The device according to claim 36, wherein said lever in said second position thereof displaces said follower surface from said cam and disables displacement of said latch member by said cam and spring means.

38. The device according to claim 37, and means independent of said motor means for manually displacing said crank and said lever from said second lever position to said first lever position thereby releasing said latch member for said spring means to bias said follower surface against said cam.

39. The device according to claim 38, wherein said means for manually displacing said crank and lever includes an opening in said housing for accessing said lever.

40. The device according to claim 39, and a pin reciprocably supported in said opening and having an inner end in said housing positioned to engage and displace said lever from said second to said first position upon displacement of said pin inwardly relative to said housing.

41. The device according to claim 40, and a manually operable actuator member attached to said pin and having an end exposed outside said housing for displacing said pin relative to said opening.

42. The device according to claim 37, wherein said latch member includes means providing a surface engaged by said lever during displacement of said lever from said first to said second position thereof to displace said latch member to said unlatched position in which said follower surface is displaced from said cam, and means selectively operable to displace said lever to an inoperative position with respect to engaging said surface.

43. The device according to claim 42, wherein said means providing a surface on said latch member is a latch pin having a pin axis and an outer end spaced from said latch member, said lever being pivotal about a lever axis parallel to said pin axis, and said selectively operable means including means to displace said lever axially of said lever axis and outwardly relative to said latch pin to a position spaced from said outer end.

44. The device according to claim 43, and a pivot pin mounting said lever in said housing for pivotal displacement about said lever axis, said pivot pin being reciprocable between first and second axial positions relative to said housing and said latch pin to provide said selectively operable means, said lever being positioned to engage said latch pin in said first pivot pin position and being positioned to be axially spaced from said outer end in said second pivot pin position.

45. The device according to claim 44, further including a spring biasing said pivot pin toward said first position thereof, and means to releasably hold said pivot pin in said second position thereof against the bias of said spring.

46. The improvement according to claim 45, wherein said pivot pin includes a cross pin transverse to said lever axis, and said means to hold said pivot pin includes recess and shoulder means in said housing, said shoulder means providing said second position of said pivot pin, and said pivot pin in said second position being pivotal about said lever axis to position said cross pin to engage said shoulder means.

47. An anti-theft device for attachment to a steering wheel of an automotive vehicle, said anti-theft device comprising: connection means for attaching said anti-theft device to said steering wheel, means for restricting rotation of said steering wheel when said device is attached thereto, electrically operated locking means for locking and unlocking said connection means, a continuously energized electrical control circuit for said locking means, said control circuit having first and second conditions, means for activating said locking means to unlock said connection means when said control circuit is in said first condition and to lock said connection means when said control circuit is in said second condition, and control means for operating said control circuit from outside said vehicle, said control means including means for continuously transmitting a control signal at given intervals from outside said vehicle for maintaining said control circuit in said first condition when said control means is within a predetermined distance from said vehicle, and said control circuit including means for shifting from said first condition to said second condition when said control means is beyond said predetermined distance.

48. An anti-theft device as defined in claim 47, wherein said control means includes a personal identification unit to be carried by an authorized operator of said vehicle for shifting said control circuit from said first condition to said second condition.

49. An anti-theft device as defined in claim 48, wherein said predetermined distance is within the vicinity of said vehicle.

50. An anti-theft device as defined in claim 49, wherein said predetermined distance is within 50 feet of said vehicle.

51. An anti-theft device as defined in claim 49, wherein said control circuit shifts automatically to said second condition when said personal identification unit is removed from said vicinity of said vehicle.

52. An anti-theft device as defined in claim 48, wherein said control circuit and said personal identification unit include means for identifying the location of said personal identification unit in the vicinity of said anti-theft device.

53. An anti-theft device as defined in claim 52, wherein said means for identifying the location of said personal identification unit includes a transmitter located in said personal identification unit, said transmitter having means for transmitting said control signal, said control signal being an electromagnetic signal in a coded pattern unique to said transmitter, and a receiver in said control circuit, said receiver having means for recognizing said coded pattern.

54. An anti-theft device as defined in claim 53, wherein said transmitter transmits said electromagnetic signal periodically at a given interval.

55. An anti-theft device as defined in claim 54, wherein said interval is about 10.0 seconds.

56. An anti-theft device as defined in claim 54, wherein said control circuit includes timer means for timing said first condition and shifting to said second condition when said signal from said transmitter is not received within a predetermined time period exceeding said given interval and for resetting said timer upon receipt of a signal from said transmitter within said predetermined time period.

57. An anti-theft device as defined in claim 48, wherein said control means includes means for shifting said control circuit to said second condition at a predetermined time subsequent to the removal of said personal identification unit beyond said predetermined distance from said vehicle.

58. An anti-theft device as defined in claim 57, where said predetermined time is at least 30 seconds.

59. An anti-theft device as defined in claim 57, wherein said control circuit includes means for shifting from said second to said first condition when said personal identification unit is within said vicinity of said vehicle.

60. An anti-theft device as defined in claim 47, wherein said control means is manually operable for shifting said control circuit between said first and second conditions.

61. An anti-theft device as defined in claim 47, wherein said locking means includes motor means in said anti-theft device for locking and unlocking said connection means, said motor means being connected to said control circuit and operated to lock said connection means when said control circuit is in said second condition and to unlock said connection means when said control circuit is in said first condition.

62. An anti-theft device as defined in claim 61, and a source of electrical power in said anti-theft device for energizing said control circuit and said motor means.

* * * * *